(12) United States Patent
Papsdorf et al.

(10) Patent No.: US 10,717,606 B2
(45) Date of Patent: Jul. 21, 2020

(54) METHOD OF INDEPENDENTLY CONTROLLING MOTION OF MOVERS ALONG A PATH

(71) Applicant: The Procter & Gamble Company, Cincinnati, OH (US)

(72) Inventors: Clifford Theodore Papsdorf, Loveland, OH (US); Jason Lee DeBruler, West Chester, OH (US); Stephen Douglas Congleton, Loveland, OH (US); Mark Neil Howdyshell, Mason, OH (US)

(73) Assignee: The Procter and Gamble Company, Cincinnati, OH (US)

( * ) Notice: Subject to any disclaimer, the term of this patent is extended or adjusted under 35 U.S.C. 154(b) by 0 days.

(21) Appl. No.: 15/990,851

(22) Filed: May 29, 2018

(65) Prior Publication Data

US 2019/0367288 A1    Dec. 5, 2019

(51) Int. Cl.
| | | |
|---|---|---|
| *G06F 7/00* | (2006.01) | |
| *B65G 43/00* | (2006.01) | |
| *G05B 19/042* | (2006.01) | |
| *B65G 17/12* | (2006.01) | |

(52) U.S. Cl.
CPC .............. *B65G 43/00* (2013.01); *B65G 17/12* (2013.01); *G05B 19/042* (2013.01); *B65G 2203/0291* (2013.01); *G05B 2219/2621* (2013.01)

(58) Field of Classification Search
None
See application file for complete search history.

(56) References Cited

U.S. PATENT DOCUMENTS

| | | |
|---|---|---|
| 4,524,858 A | 6/1985 | Maxey |
| 4,619,205 A | 10/1986 | Sticht |
| 4,803,639 A | 2/1989 | Steele |
| 4,825,111 A | 4/1989 | Hommes et al. |
| 5,226,524 A | 7/1993 | Guttinger |

(Continued)

FOREIGN PATENT DOCUMENTS

| | | |
|---|---|---|
| CN | 104771104 A | 5/2014 |
| EP | 2982472 | 2/2016 |

(Continued)

OTHER PUBLICATIONS

U.S. Appl. No. 15/990,850, filed May 29, 2018, Papsdorf et al.

(Continued)

*Primary Examiner* — Yolanda R Cumbess
(74) *Attorney, Agent, or Firm* — Alexandra S. Anoff

(57) ABSTRACT

A system and an apparatus capable of independently driving movers are described herein. The system and apparatus includes: a track that forms a path for movers; a plurality of movers movably mounted on the track for moving along the path; and a plurality of drive elements fixedly arranged along the track. The drive elements each have a surface that is oriented to contact a driven member of the movers. The drive elements are configured to sequentially engage the driven member of a plurality of the movers to provide controlled independent motion of the movers along the track. The drive elements may be driven by rotary motors. A method of independently driving movers is also described herein.

20 Claims, 20 Drawing Sheets

(56) References Cited

U.S. PATENT DOCUMENTS

| | | | |
|---|---|---|---|
| 5,388,684 A | 2/1995 | Peck | |
| 6,170,634 B1 | 1/2001 | Jaquet | |
| 6,190,117 B1 * | 2/2001 | Lichti | B65G 1/133 |
| | | | 211/1.51 |
| 6,308,818 B1 | 10/2001 | Bonora | |
| 6,536,583 B2 | 3/2003 | Luigi | |
| 6,595,346 B1 | 7/2003 | Advani | |
| 6,698,574 B2 | 3/2004 | Frommenwiler | |
| 6,868,747 B2 | 3/2005 | Goeser | |
| 6,876,107 B2 | 4/2005 | Jacobs | |
| 6,876,896 B1 | 4/2005 | Ortiz et al. | |
| 7,134,258 B2 | 11/2006 | Kalany et al. | |
| 7,380,654 B2 | 6/2008 | Barry | |
| 7,669,498 B2 | 3/2010 | Sheu | |
| 7,677,384 B2 | 3/2010 | Veile | |
| 7,859,139 B2 | 12/2010 | Jacobs | |
| 8,286,783 B2 | 10/2012 | Baba | |
| 8,397,896 B2 | 3/2013 | Kleinikkink et al. | |
| 8,424,672 B2 | 4/2013 | Kim | |
| 8,448,776 B2 | 5/2013 | Papsdorf et al. | |
| 8,678,182 B2 | 3/2014 | Junk | |
| 8,720,666 B2 | 5/2014 | Papsdorf et al. | |
| 8,812,152 B1 * | 8/2014 | Giloh | B65G 35/08 |
| | | | 700/230 |
| 8,896,241 B2 * | 11/2014 | Wernersbach | B65G 43/00 |
| | | | 318/38 |
| 9,008,831 B1 | 4/2015 | Jacobs et al. | |
| 9,126,813 B2 | 9/2015 | Junk | |
| 9,260,210 B2 | 2/2016 | Jacobs et al. | |
| 9,540,127 B2 | 1/2017 | Papsdorf et al. | |
| 9,573,771 B2 | 2/2017 | Papsdorf et al. | |
| 9,590,539 B2 | 3/2017 | Wernersbach et al. | |
| 9,632,103 B2 | 4/2017 | Donohue | |
| 9,873,573 B2 | 1/2018 | Wiesmann | |
| 10,399,788 B2 | 9/2019 | Suzuki | |
| 2002/0065171 A1 * | 5/2002 | Raber | F16D 21/06 |
| | | | 477/175 |
| 2007/0056833 A1 | 3/2007 | Cash, III | |
| 2007/0068774 A1 | 3/2007 | Giometti | |
| 2008/0210519 A1 | 9/2008 | Jeon | |
| 2012/0097503 A1 | 4/2012 | Moutie | |
| 2014/0244028 A1 | 8/2014 | Giloh et al. | |
| 2016/0039061 A1 | 2/2016 | Feyrer | |
| 2016/0161520 A1 | 6/2016 | Pedrazzini | |
| 2016/0257089 A1 | 9/2016 | Deering | |
| 2016/0362257 A1 | 12/2016 | Papsdorf | |
| 2017/0081135 A1 * | 3/2017 | Wernersbach | B60L 13/006 |
| 2017/0163197 A1 | 6/2017 | Wernersbach et al. | |
| 2018/0229942 A1 | 8/2018 | Scholz | |
| 2019/0367284 A1 | 12/2019 | Papsdorf | |
| 2019/0367290 A1 | 12/2019 | Papsdorf | |
| 2019/0367291 A1 | 12/2019 | Papsdorf | |

FOREIGN PATENT DOCUMENTS

| | | |
|---|---|---|
| EP | 2958834 B1 | 12/2016 |
| EP | 1530541 B1 | 7/2019 |
| WO | WO200064751 A1 | 11/2012 |
| WO | WO200064753 A1 | 11/2012 |
| WO | WO200064791 A1 | 11/2012 |
| WO | WO2017015685 A1 | 2/2017 |
| WO | WO2018100081 A1 | 6/2018 |

OTHER PUBLICATIONS

U.S. Appl. No. 15/990,852, filed May 29, 2018, Papsdorf et al.
U.S. Appl. No. 15/990,853, filed May 29, 2018, Papsdorf et al.
All Office Actions, U.S. Appl. No. 15/990,853.
European Search Report for EP19175677.4 (P&G Case 15247) dated Oct. 21, 2019.
All final and non-final office actions for U.S. Appl. No. 15/990,850.
All final and non-final office actions for U.S. Appl. No. 15/990,852.
All final and non-final office actions for U.S. Appl. No. 15/990,853.
European Search Report for EP19175640.2 dated Nov. 7, 2019.
European Search Report for 19175306.0 dated Oct. 24, 2019.
European Search Report for EP19175409.2 dated Feb. 12, 2020.

* cited by examiner

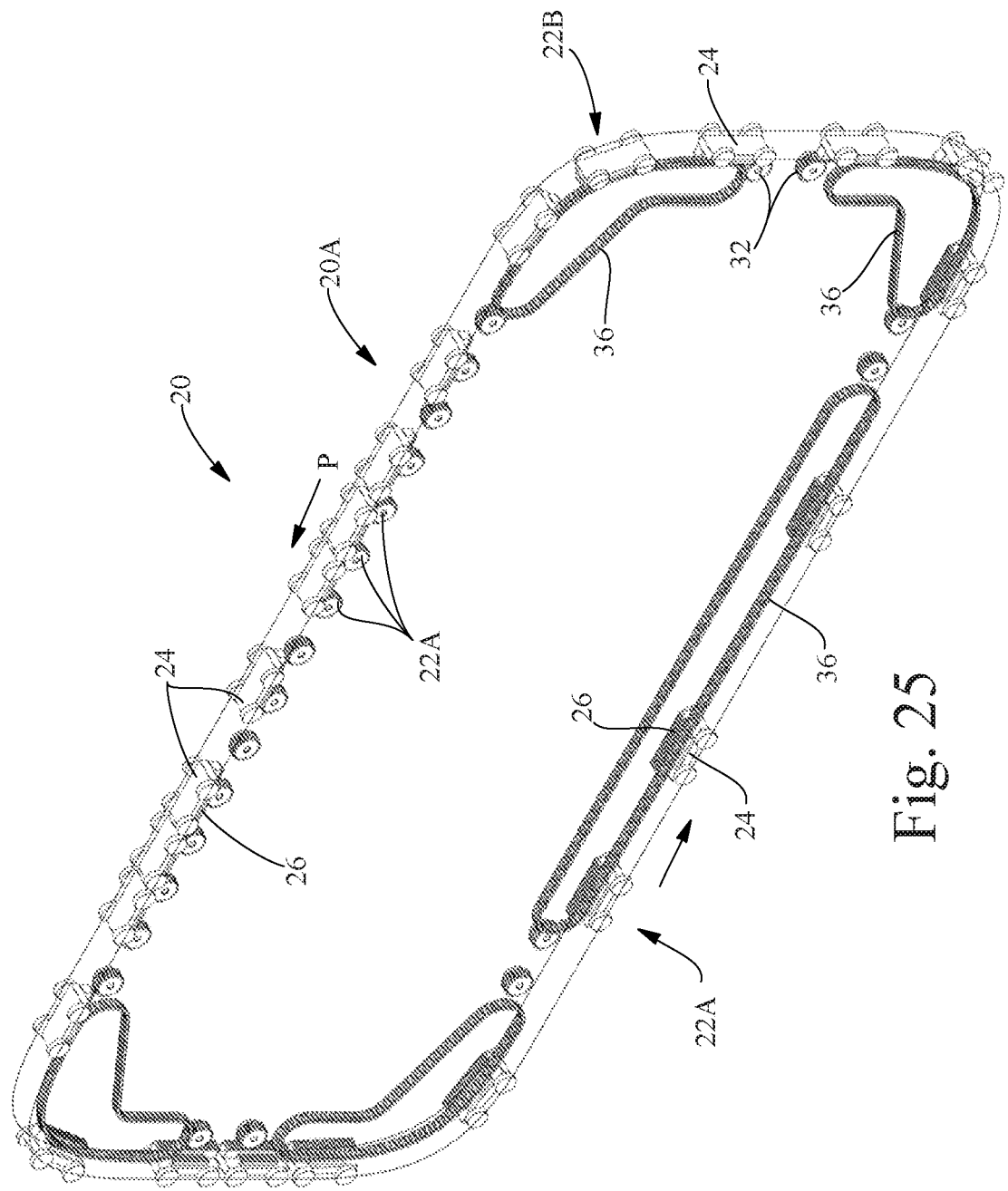

METHOD OF INDEPENDENTLY CONTROLLING MOTION OF MOVERS ALONG A PATH

FIELD OF THE INVENTION

A controlled motion system and an apparatus capable of independently driving movers are described herein. A method of independently driving movers is also described herein.

BACKGROUND OF THE INVENTION

Systems and methods for driving vehicles in various processes are commercially available and/or disclosed in the patent literature. Such systems and methods include: U.S. Pat. Nos. 4,825,111; 5,388,684; 6,170,634; 6,536,583; 6,876,107 B2; U.S. Pat. No. 6,876,896 B1; U.S. Pat. Nos. 7,134,258; 7,859,139 B2; 8,397,896 B2; 8,448,776 B2; 8,678,182; 8,812,152; 8,896,241 B2; 9,008,831 B1; 9,126,813; 9,260,210 B2; 9,540,127,B2; 9,590,539,B2; US 2012/0097503; US2014/0244028; US 2016/0039061 A1; US 2017/0081135 A1; US 2017/0163197 A1; and in the following international patent applications: EP1530541; EP2958834; EP2982472 A1; WO 200064751 A1; WO 200064753 A1; and WO 200064791 A1.

Track systems for transporting vehicles are known. Such track systems include linear synchronous motor (LSM) based systems that facilitate propulsion of vehicles along the track using electromagnetic force (EMF). Commercially available LSM systems include Rockwell Automation's iTRAK™ intelligent track system; Beckhoff Automation's XTS available from Beckhoff Automation GmbH of Verl, Germany; and, MagneMotion's MAGNEMOVER® LITE intelligent conveyor system available from MagneMotion, Inc. of Devens, Mass., U.S.A. Although such systems can provide a high degree of independence of movement of vehicles along their tracks, and can be used in many different processes, their current performance may be less than desirable for many high speed converting applications. For example, some of such systems are limited to conveying vehicles at a maximum velocity of 2.5-5 meters/second. The magnetic thrust force generated by these systems can also drop off considerably as velocity increases.

Thus, there is a need for improved apparatuses and methods for independently driving movers (or vehicles). In particular, there is a need for apparatuses and methods for independently driving movers at higher speeds and forces that are capable of matching the needs of high speed converting operations.

SUMMARY OF THE INVENTION

A controlled motion system and an apparatus capable of independently driving movers (or vehicles) are described herein. A method of independently driving movers is also described herein.

The apparatus, in some cases, may comprise:
a track that forms a path for movers;
a plurality of movers movably mounted on the track for moving along the path, the movers including a driven member (such as a rack joined to the mover) that is oriented to be contacted by at least one drive element (such as a pinion or timing belt) at any position along the path; and
a plurality of drive elements arranged along the track, the drive elements each comprising a surface that is oriented to contact the driven member (e.g., rack) of the movers, wherein the drive elements are configured to sequentially engage the driven member of a plurality of the movers to provide controlled motion of the movers independently around the track. The drive elements may each be driven by a rotary motor.

In some cases, the apparatus may control the motion of independent movers located in different lanes along a path. In such cases, the apparatus may comprise:
a track that forms a path for movers;
a first lane and a second lane that are parallel to the path;
a first mover movably mounted on the track for moving along the path, the first mover comprising a first driven member that is oriented to travel in the first lane and to be contacted by at least one drive element at any position along the path;
a second mover movably mounted on the track for moving along the path, the second mover comprises a second driven member that is oriented to travel in the second lane and to be contacted by at least one drive element at any position along the path;
a first plurality of drive elements arranged along the first lane of the track, the drive elements each comprising a surface that is oriented to contact the first driven member of the first mover, wherein the drive elements are configured to sequentially engage the first driven member of the movers to provide controlled motion of the first mover independently around the track, wherein the drive elements are each driven by a rotary motor;
a second plurality of drive elements fixedly arranged along the second lane of the track, the drive elements each comprising a surface that is oriented to contact the second driven member of the second mover, wherein the drive elements are configured to sequentially engage the second driven member of the movers to provide controlled motion of the second mover independently around the track, wherein the drive elements are each driven by a rotary motor.

In some cases, the apparatus may provide controlled transport of articles along a path. Such an apparatus may comprise:
a track that forms a closed loop path for movers;
a plurality of movers that are configured to transport articles, the movers being movably mounted on the track for moving along the closed loop path, the movers comprising a driven member that is oriented to be contacted by at least one drive element at any position along the path;
a plurality of drive elements arranged along the track, the drive elements each comprising a surface that is oriented to contact the driven member of the movers, wherein the drive elements are configured to sequentially engage the driven member of the movers to provide controlled motion of the movers independently around the track, wherein the drive elements are each driven by a rotary motor.

The apparatuses described above may further comprise a control system in communication with the rotary motors for controlling the motion of the rotary motors. The control system may comprise a programmable computer control system.

A method of independently controlling the velocity profile of movers traveling along a path is also described herein. In some cases, the method may comprise the steps of:
a) providing a system comprising:
 a track that forms a path for movers;
 a plurality of movers movably mounted on the track for moving along the path, the movers comprising a driven member that is oriented to be contacted by at least one drive element, wherein the movers comprise at least a first mover and a second mover; and a plurality of rotationally free drive elements having rotational axes that are arranged along the track, wherein the drive elements comprise at least a first drive element and a second drive element, the drive elements each comprising a surface that is oriented to contact the driven member of the movers, wherein the drive elements are configured to sequentially engage the driven member of a plurality of the movers to provide controlled motion of the movers independently around the track, wherein the drive elements may each be driven by a rotary motor;

b) engaging the first mover mechanically with the first drive element at a first position on the path, wherein the first drive element is moving with a first rotational velocity, and the first rotational velocity of the first drive element prescribes the tangential velocity of the first mover;

c) moving the first mover with the first drive element at a first velocity and first acceleration to a second position/location on the path; and d) engaging the first mover mechanically with the second drive element at a second position on the path, wherein the second drive element is moving with a second rotational velocity, and the second rotational velocity prescribes the tangential velocity of the first mover.

A method of independently controlling the velocity profile of movers traveling along a path. In some cases, the method may comprise the steps of:

a) providing a system comprising:

a track that forms a path for movers;

a plurality of movers movably mounted on the track for moving along the path, the movers comprising a driven member that is oriented to be contacted by at least one drive element at any position along the path, wherein the movers comprise at least a first mover and a second mover;

a plurality of rotationally free drive elements having rotational axes that are arranged along the track, wherein the drive elements comprise at least a first drive element and a second drive element, wherein the second drive element is positioned downstream in a machine direction from the first drive element, the drive elements each comprising a surface that is oriented to contact the driven member of the movers, wherein the drive elements are configured to sequentially engage the driven member of the movers to provide controlled motion of the movers independently around the track, wherein the drive elements are each driven by a rotary motor; and a programmable computer control system in communication with the rotary motors for controlling the motion of the rotary motors;

b) synchronously mechanically engaging the driven member of the first mover mechanically with the first drive element at a first position along the path, wherein the first drive element is driven by a first rotary motor with a first rotational velocity, and the first rotational velocity of the first drive element prescribes the tangential velocity of the first mover;

c) moving the first mover with the first drive element at a first velocity profile and first acceleration to a second position;

d) synchronously mechanically engaging the first mover with the second drive element at a second position, wherein the second drive element is driven by a second rotary motor with a second rotational velocity, and the second rotational velocity prescribes the tangential velocity of the first mover;

e) moving a second mover and its driven member into position to approach and mechanically engage the first drive element, wherein the driven member of the second mover is moving at a tangential velocity;

f) adjusting the rotational velocity of the first drive element with the first drive motor to a third rotational velocity, where the third rotational velocity of the first drive element causes the tangential velocity of the first drive element to match the tangential velocity of the approaching driven member of the second mover; and the mechanical engagement between the first drive element and the approaching driven member of the second mover are synchronized; and g) synchronously mechanically engaging the driven member of the second mover with the first drive element at the first position wherein the first drive element is driven by the first rotary motor with the third rotational velocity, and the third rotational velocity of the first drive element prescribes the tangential velocity of the second mover; while the tangential velocity of the first mover is independently controlled by the second drive element driven by the second rotary motor.

The components of the apparatuses described herein, and the steps of the methods described herein, can be combined in any suitable manner to provide any number of additional embodiments.

BRIEF DESCRIPTION OF THE DRAWINGS

FIG. 25 is a simplified schematic side view of an exemplary closed path controlled motion system created with a combination of sections driven by pinion gears and timing belts.

DETAILED DESCRIPTION OF THE INVENTION

A controlled motion system and an apparatus capable of independently driving movers are described herein. A method of independently driving movers is also described herein.

Figure 1:
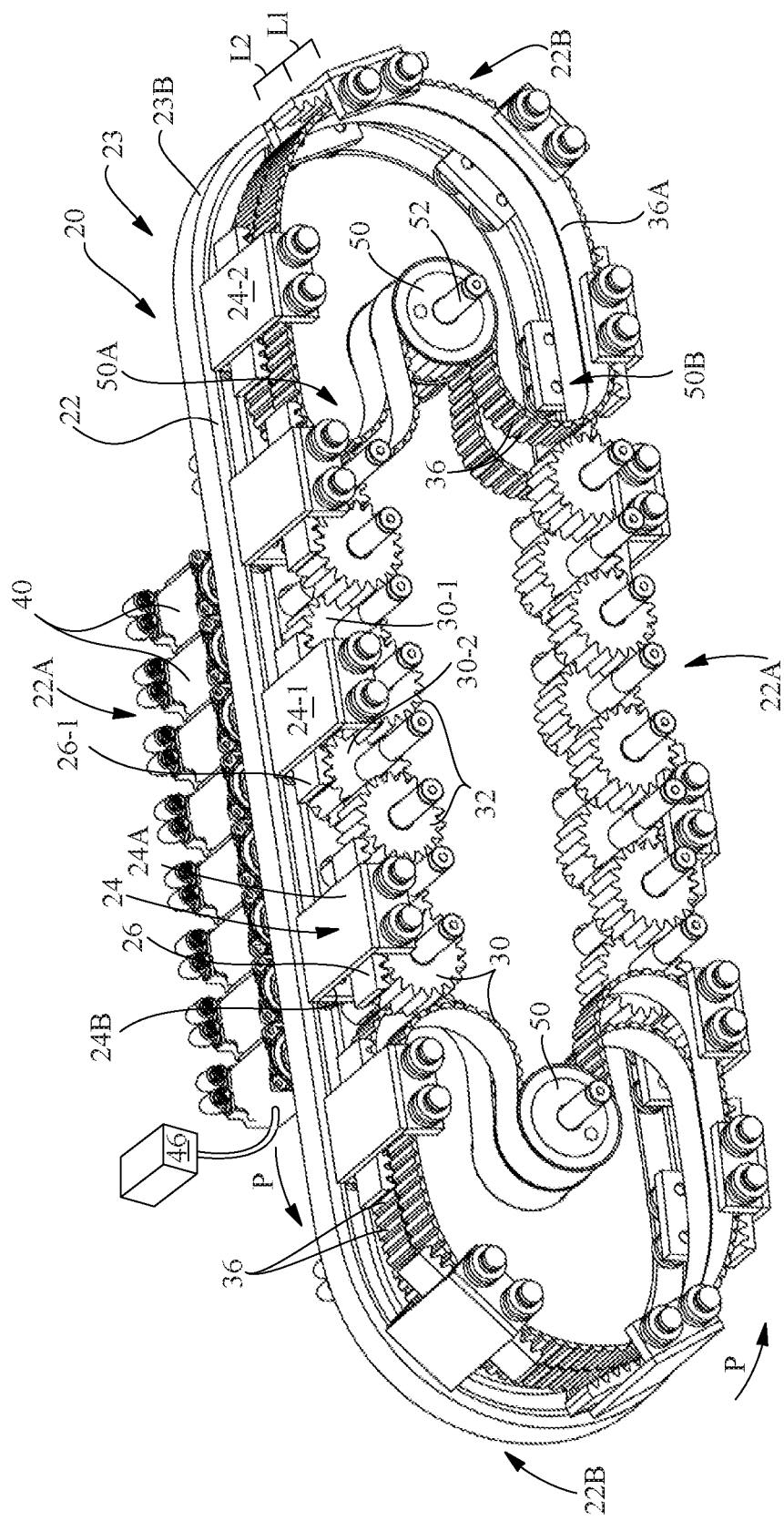
FIG. 1 is a schematic front perspective view of one embodiment of apparatus capable of independently driving movers (with certain portions of the apparatus removed).

FIG. 1 shows one non-limiting example of a controlled motion system and apparatus 20. The controlled motion system 20 may serve as a conveyor. The controlled motion system and apparatus 20 comprises: a track 22 that forms a path P for movers 24; and a plurality of movers (or "vehicles") 24 movably mounted on the track for moving along the path P. The movers 24 can be used to transport any suitable type of article (or component of an article) 10 in a process, such as in a manufacturing process. Articles 10 are shown in the embodiment of the apparatus shown in FIG. 23. The movers 24 are joined to a driven feature or member 26 that is oriented to be contacted by at least one drive element 30. A plurality of drive elements designated generally as 30 are arranged along the track 22, and are driven by motors 40.

The system 20 provides for the transport of a plurality of movers 24 at independent controlled tangential velocities along the path P. The term "tangential velocity" is the measure of velocity in the direction of a path, and is independent of the path curvature. The tangential velocity, thus, applies to a straight line paths as well as curvilinear paths. When it is said that the movers 24 are independently controlled, it is meant that the spacing and velocities of the different movers 24 can be varied with respect to each other. The movers 24 are driven by a plurality of drive elements 30 (such as gear pinions 32 and/or timing belts 36) arranged along the path P that sequentially engage the driven feature or member (such as a gear rack or racks) 26 joined to the movers 24. (The phrase "joined to" is defined at the end of this specification.) The position and velocity of each mover 24 is positively controlled by one or more drive elements 30

(e.g., driving pinion or timing belt) in control of the rack(s) 26. The rack(s) 26 associated with the mover 24 can be passed between adjacent drive elements (such as pinions and/or timing belts) 30—so that at time of transfer, the rack 26 is controlled by both leading and trailing drive elements 30.

The term "article", as used herein with respect to the item being transported, includes, but is not limited to a product, a package, a label, or any portion, component, or partially formed part of any of the foregoing. The term "article" may also include tools, or any other type of article that it is desirable to transport using the controlled motion system. When there are multiple articles, they may be referred to as a first article, a second article, a third article, etc. The movers 24, the driven members 26, the drive elements 30, and other components of the controlled motion system 20 may also be referred to as a first, a second, a third, etc., when there is more than one of the same.

The track 22 can be in any suitable configuration. The track 22 may define a linear path, a curvilinear path, or it may comprise both linear and curvilinear portions. The configuration of the track 22 may form an open path (that is, a path that has a beginning and an end that are in different locations), or a closed path. Non-limiting examples of track configurations include those which define: linear paths, curvilinear paths, circular paths, elliptical paths, spline paths, curvilinear or spline paths with non-constant radii, race track configured paths, and open paths or closed loop paths in any other configurations. The term "spline" is used herein in the mathematical sense, and refers to a piecewise polynomial parametric curve constructed so as to approximately pass through a given set of point parameters. In the embodiment shown in FIG. 1, the track 22 is an endless loop conveyor that is in a race track configuration that comprises both linear portions 22A (along the sides of the track) and curvilinear portions 22B at the ends of the track. The track 22 may be of any suitable configuration. In some cases, the track 22 may be planar. The apparatus will typically consist of two parallel planar tracks 22 that are symmetric about a central plane between the two parallel tracks 22. Typically, this will result in a front track 22C and a rear track 22D.

Figure 6:
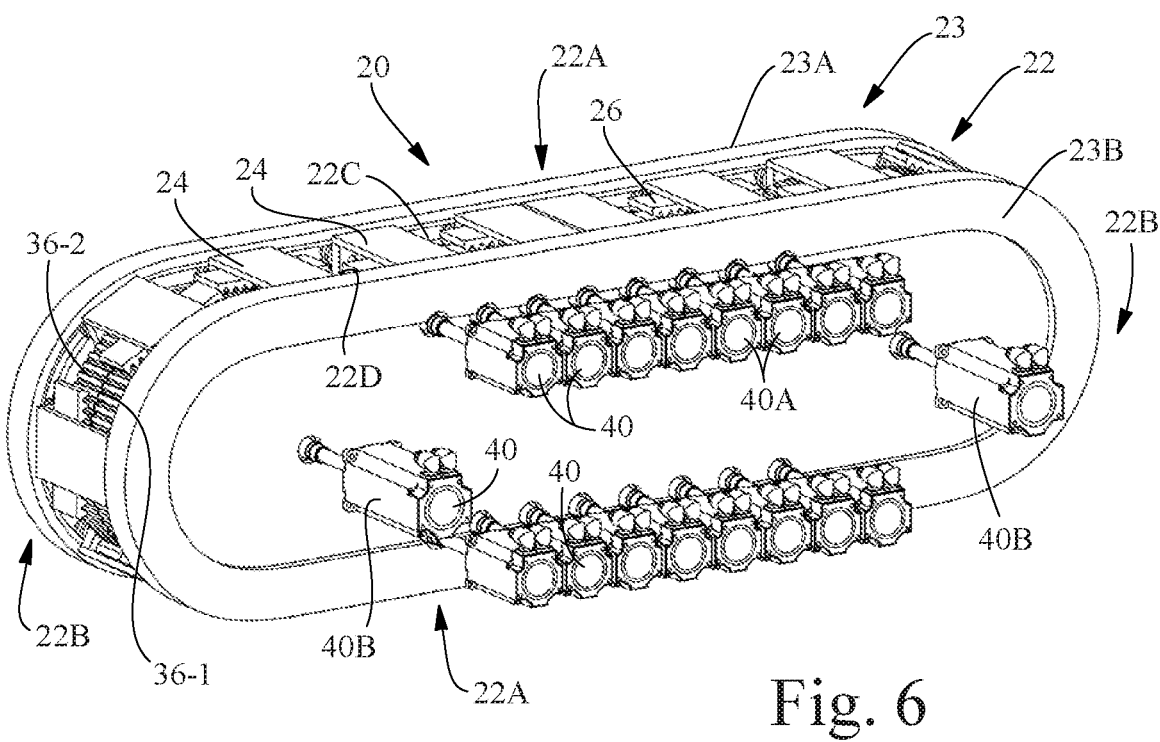
FIG. 6 is a schematic rear view of the apparatus shown in FIG. 1 that shows the rotary servo motors that drive the pinions.

As shown in FIG. 6, the track 22 may comprise a frame structure 23 that comprises two spaced apart frame members 23A and 23B that are joined together. The frame members comprise a front frame member 23A and a rear frame member 23B. The movers 24 may be located in the space between the frame members 23A and 23B. It is possible for the movers 24 to be configured such that some portion or all of the mover 24 is outside the frame members 23A and 23B. Typically, the front track 22C will be attached to or an integral part of front frame member 23A. Typically, the rear track 22D will be attached to or an integral part of rear frame member 23B. One or more lanes for the drive of the movers 24 can be arranged between the frame members 23A and 23B. The term "lanes", as used herein, refers to several parallel regions inside the track. Typically, the drive components such as the pinions, racks, and belts, for the movers located in each lane will reside in the lanes in which the respective movers will travel.

These lanes are parallel to the track 22.

Figure 19:
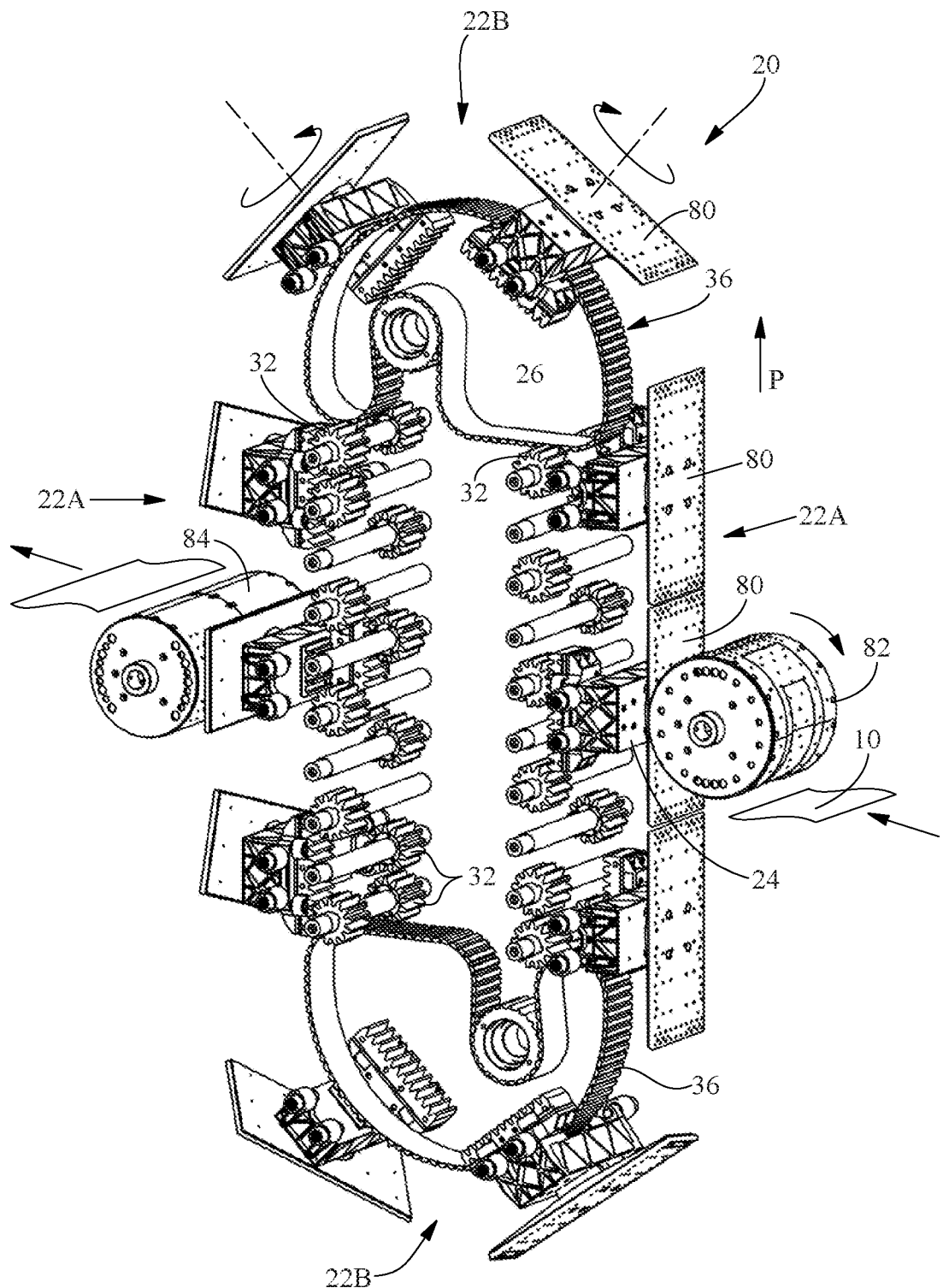
FIG. 19 is a perspective view of a portion of an apparatus for turning and re-pitching a component that could be used to manufacture a baby diaper or other disposable products (with various components not shown for simplicity).

The apparatus 20 shown in FIG. 1 is described as a front view. In this embodiment, the path P lies in a vertical plane. The linear portions 22A of the track 22 are generally horizontally oriented and spaced apart in the vertical plane. The curvilinear portions 22B are generally vertically oriented. However, the entire apparatus 20 can be reoriented in any suitable orientation. For example, in another embodiment (as shown in FIG. 19), the apparatus 20 can be "stood on" one of its ends 22B so that the linear portions 22A of the track 22 are generally vertically oriented, and the curvilinear portions 22B are generally horizontally oriented. In another embodiment, the apparatus 20 can be oriented so that the path P lies in a horizontal plane. In other embodiments, the apparatus 20 can be oriented in any orientation between horizontal and vertical.

The movers 24 can be independently driven by the drive elements 30 along at least a portion of the track 22. When it is said that "the movers may be driven by the drive elements", it should be understood that it is meant that the movers 24 may be directly, or indirectly, driven by the drive elements 30 (an example of the later situation occurs if the movers 24 are joined to driven members 26, the driven members are driven by the drive elements 30). The movers 24 may be directly or indirectly driven by mechanical engagement (such as through the use of meshing gear teeth). Alternatively, the drive may be by friction between the drive element 30 and the mover 24 (or the driven member 26). For instance, a belt having a smooth outer surface can be used with a driven member 26 having a surface configured for frictional engagement with the surface of the belt. The term "mechanical engagement", as used herein, will encompass both interlocking (e.g., meshing teeth) and frictional types of engagement. Thus, the movers 24 will not be driven by magnetic forces (as in a linear motor). The term "synchronously engaging" may be used herein to refer to synchronizing the teeth on the drive elements 30 with the teeth on the driven members 26 at matched registration position and matched tangential velocity so that the mating teeth engage smoothly, quietly, and with good control. In the case where the drive of the driven member 26 is by frictional engagement, then "synchronously engaging" refers to matched tangential velocity between drive elements 30 and drive member 26.

The movers 24 have an outer surface 24A and an inwardly-facing surface (or "inner surface") 24B. The movers 24 can have any suitable configuration. For example, in several of the embodiments shown in the drawings, the movers 24 may be generally in the configuration of flat plates. The flat plates can be of any suitable configuration including, but not limited to: square, rectangular, and circular. The movers 24 can be configured to hold articles 10 having a variety of configurations. Alternatively, the outer surface 24A of the movers 24 can be configured more precisely correspond to the shape of the portion of the articles 10 that faces the movers 24. As shown in FIG. 1, the outer surface 24A of the movers 24 can be generally at the same level (or at the same level) as the outermost section of the frame 23 of the track 22. However it is possible to configure that movers 24 such that the outer surface 24A extends well outside or inside the envelope of the frame 23.

The apparatus 20 may transport the movers 24 at a constant velocity, a variable velocity, or combinations thereof. The rotation of the movers 24 around the track 22 may be continuous, intermittent, or combinations thereof. The movers 24 may rotate in a clockwise and/or counter clockwise direction, although at any given time, the movers 24 will be only moving in one of these directions.

The driven features (or "driven members") 26 may comprise any suitable type of elements. In some cases, the driven features or driven members 26 may comprise portions on the underside of the movers 24 that are configured to engage drive elements 30. Alternatively, the driven members 26 may comprise separate components that are joined to the movers 24. The driven members 26 may have an outer surface 26A that faces its associated mover 24, and an inwardly-facing surface (or "inner surface") 26B that faces the drive elements 30. Suitable driven members 26 include, but are not limited to the gear rack of a rack and pinion assembly that engages a gear pinion. The driven member 26 may also be a rack or toothed member that engages a toothed belt, such as a timing belt. In another embodiment, the driven member 26 may be a friction surface joined to the mover 24 that is in contact with a friction roller or a friction belt.

The drive elements 30 may comprise any suitable type of components that are capable of engaging and moving the driven members 26. The drive elements 30 may be positioned in any suitable location relative to the track 22. As shown in FIG. 1, the drive elements 30 may be located inward of the outermost surface of the frame 23 of the track 22. (Thus, the drive elements 30 may be located inside a track 22 that forms a closed loop path P.)

Suitable drive elements 30 include, but are not limited to pinion gears, belts, particularly toothed belts (such as toothed timing belts), chain sprockets, chains, or roller pinions. The belts may be in an endless loop configuration. The drive elements 30 for a given controlled motion system 20 can comprise a single type of component, or a combination of two or more different types of components. If there are multiple drive elements 30, they may all be similar in type. For example, all of the drive elements in the controlled motion system 20 may comprise pinion gears 32. In another example, all of the drive elements 30 in the controlled motion system 20 may comprise belts 36. Belts may provide a cost advantage in that they can span a larger portion of the path P than several pinion gears, while only needing a single motor to drive the same. In other cases, the drive elements may comprise a combination of different types of components.

In some cases, for example, the drive elements 30 in a given controlled motion system may comprise a combination of pinion gears 32 and belts 36. For example, the belts 36 can be used such as at the ends of the track where relative motion between the movers 24 may not be necessary. In the embodiment shown in FIG. 1, there are a pair of toothed belts 36 at each of the ends of the track. The drive elements 30 (typically, at least a portion thereof) may mechanically engage the driven members 26 and rotate. The mechanically engaged portion of the drive element 30 will drive tangentially to the mover path P. When the drive elements 30 are pinion gears 32, they will have a single central axis of rotation.

Figure 4:
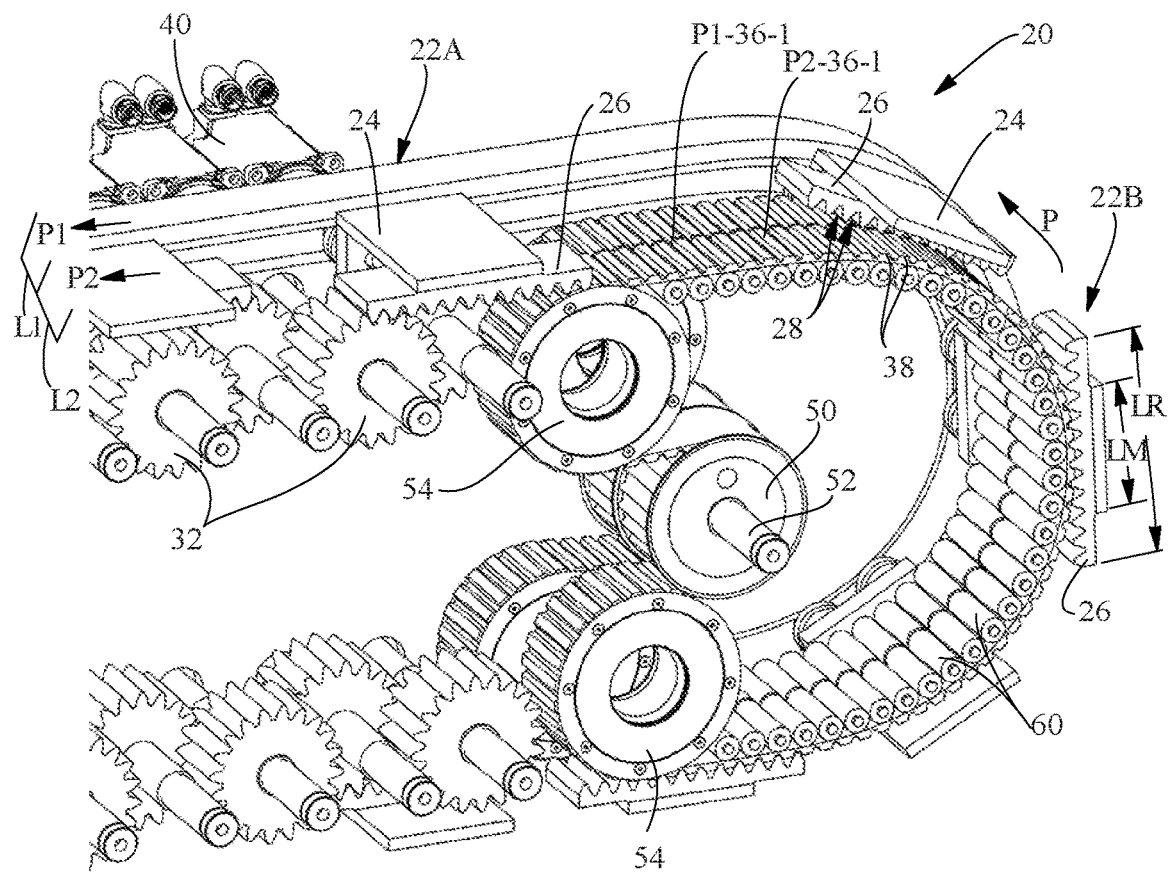
FIG. 4 is an enlarged fragmented perspective view of the apparatus shown in FIG. 1 that shows one of the toothed belts in greater detail.
Figure 11:
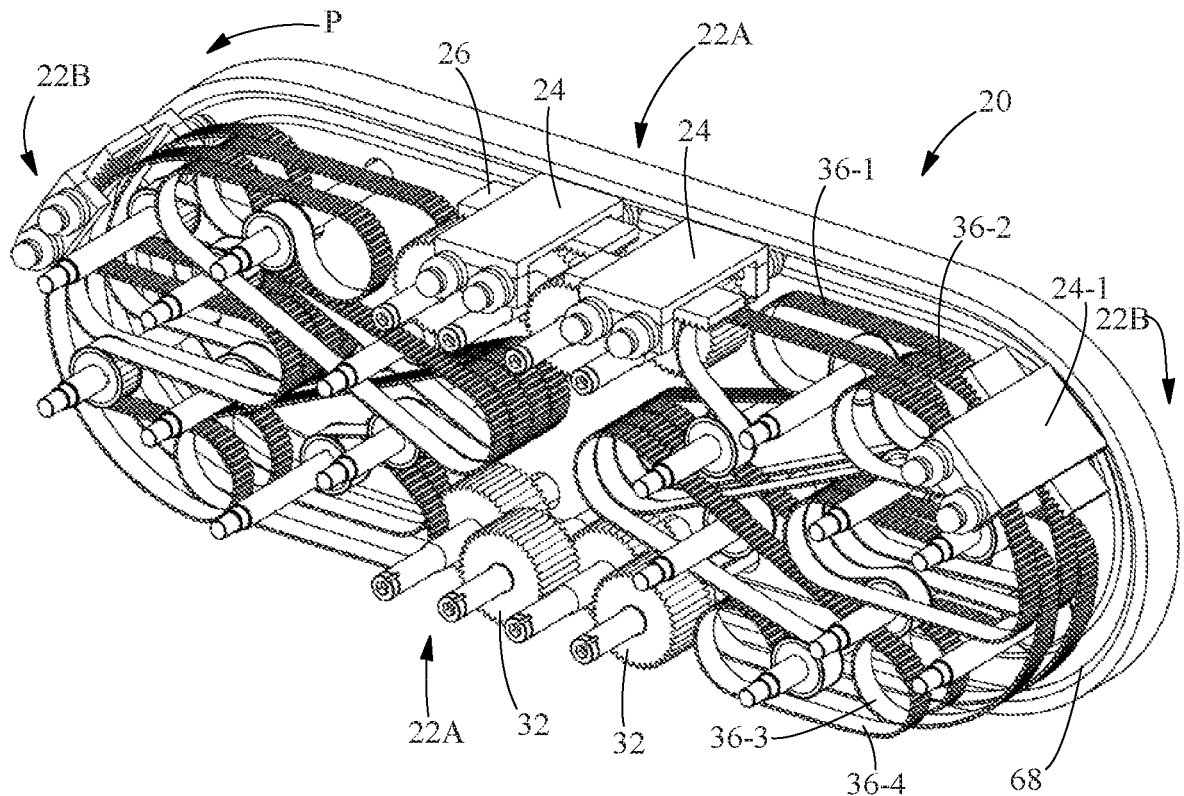
FIG. 11 is a schematic front perspective view of an alternative embodiment of an apparatus which is provided with additional drive belts for allowing independent motion of the movers around the curved sections of the track.

When the drive elements 30 are belts 36, the belts may have a smooth (or toothed) inside surface 36A and a (smooth or) toothed outer surface 36B. The belts 36 will be supported by and arranged in a serpentine path to rotate around one or more drive sprockets 50. Although only one sprocket 50 is shown for each of the belts in FIG. 1, it should be understood that each belt 36 will typically be supported by two or more components such as drive sprockets 50 or guide rollers 54 (the latter being shown in FIG. 4). In FIG. 1, the additional sprockets 50 or guide rollers 54 will be in locations designated 50A and 50B. The guide rollers 54 are often non-driven idlers, but could alternatively be driven. The guide rollers 54 may have teeth to mate with any teeth on the inside surface 36A of the timing belt or they can have a smooth surface with no teeth. The inside surface 36A of the belts 36 may be supported in any suitable manner, such as by a plurality of rollers or by one or more curved backing plates or guide rails. For shorter belt spans, curved backing plates are suitable. For the longer spans, such as 180 degree belt spans, the friction associated with using a backing plate may be impractical, and backup rollers may be more suitable. The backup rollers along the inner surface of the belts in FIG. 1 are not shown for simplicity. FIG. 4 shows the backup rollers 60. In other embodiments, such as shown in FIG. 11, the apparatus 20 may have parallel timing belt drives for straight sections of the track 22 as alternative to in-line pinion gears 32. Such parallel timing belts may transfer the racks 26 to timing belt(s) that follow the curve.

When it is said that the drive elements 30 are "fixedly arranged" along the track, it is meant that the position of the axes of rotation of the drive elements 30 is fixed. It is understood that pinion gears 32 will rotate around their axes. The belts 36 are driven by sprockets 50 which are mounted on a shaft 52 with a fixed axis. The belts 36 are movable such that, at any given time, portions of the belt 36 will move along the path P. At any given time, other portions of the belts 36 will be moving around one or more sprockets 50 that impart motion to the belt 36 by virtue of being driven by a motor 40. Thus, the drive elements 30 (such as the pinion gears 32 and belts 36) are free to rotate (or "rotationally free"). Such an arrangement is distinguishable from self-powered vehicles that have motors that are incorporated into the vehicles that move along a path.

The drive elements 30 are each driven by motors such as rotary motors 40, so that there are a plurality of rotary motors 40. The term "rotary motors" includes, but is not limited to, electric motors and hydraulic motors. The rotary motors 40 can also be rotary servo motors. Thus, the controlled motion system 20 may be free of linear motors, such as linear synchronous motors that drive vehicles around a track by electromagnetic force. The rotary motors 40 can be in any suitable location relative to the track 22. As shown in FIGS. 1 and 6, some or all of the rotary motors 40 may be at least partially located outboard of the rear frame member 23B. The term "outboard", as used herein, means in a direction that is positioned away from the space between the frame members 23A and 23B in which the movers 24 are located.

Each drive element 30 may be driven by a rotary servo motor 40 with a motion profile. The drive elements 30 can be directly coupled to the rotary motors 40 such that any rotational displacement of the rotary motor 40 will result in an equal rotational displacement of the connected drive element 30. The drive elements 30 can be connected to the rotary motors 40 with any number of mechanical power transmission means known to one skilled in the art. Power transmission means could include planetary gear reducers, worm gear reducers, gear boxes, belt drives, chain drives, roller pinion drives, hydraulic transmissions, etc. The power transmission coupling between the drive element 30 and motor 40 may include a mechanical gear ratio n, such that a rotational displacement of the motor theta ($\theta$) will result in a rotational displacement of drive element 30 of 1/n*theta. Correspondingly, the angular velocity and acceleration of the drive element 30 will be 1/n of the angular velocity and acceleration of the rotary motor 40 while the torque applied to drive element 30 will be a product of n multiplied by the rotary motor 40 torque. Alternatively, the drive rotary motor 40 can be integral with the drive element 30. The motion profiles of the plurality of rotary servo motors 40 may be synchronized by a control system 46. The control system 46 can comprise a programmable computer control system.

In this system, the velocity profile of each mover 24 traveling along the path P can be controlled by synchronized cooperation with a plurality of drive elements 30 distributed along the paths P such that the velocity profile of the individual movers 24 are independently controlled. The term "velocity profile" is used herein in its ordinary sense in the field of motion control engineering. Thus, the velocity profile refers to the tangential velocity of a mover at various times and prescribed positions along a path. The velocity profile may, thus, comprise a prescribed motion plan that controls the position, velocity, acceleration, and jerk of the mover as it travels along a path and as time transpires. The velocity profile of the individual movers 24 is controlled by the commanded rotational velocity profile of the rotary motor 40 which drives the movers 24 through the mechanical drive train. The mechanical drive train includes the mechanical power transmission such as a coupling or gear reducer linking the rotary motor 40 and drive element 30 and rotary motion to tangential motion achieved between the pinion gear 32 and rack 26 or drive sprocket 50, timing belt 36, and timing belt rack 26. The position of the mover 24 along the path P can be tracked virtually in the control system or measured by means of a homing position sensor such as a camera, radar, linear encoder, an array of Hall effect sensors, linear array of position switches, or other linear displacement sensors. The position of each mover 24 along the path P (the "initial homing position" of the movers) can be initially measured at a home position by using a homing routine that moves each mover 24 by a homing position sensor. The initial homing position of each mover 24 can also be set by a mechanical set up fixture. When at the home position, the relative path position and corresponding position in a rotary feedback sensor such as an encoder or resolver internal to the rotary motor can be recorded by the programmable computer control system. After homing, the position of each mover 24 can be calculated by the programmable computer control system and tracked virtually based on movement of each rotary motor 40 that is mechanically coupled to the movers 24. With multiple free-spinning drive elements 30—both pinions 32 and drive sprockets 50, it is necessary to establish relative homing positions of any drive element 30 not engaged with movers 24 during the initial homing. One strategy is to reposition the movers 24 to new positions where they engage with different drive elements 30 and measure the new home positions. This is repeated until relative positions of all drive elements 30 have been established. It is also possible to install rotational homing sensors on all drive elements 30. These will establish the relative home between all drive elements 30 and the movers 24 once the relationship between drive elements 30 engaged with movers 24 is established. Another simple homing procedure is to complete homing with a mechanical fixture such as a long gear rack that can expand across all drive elements 30 and lock all drive elements in phase.

Torque applied by the rotary motor 40 is converted into a thrust force acting on the mover 24 tangential to the path P by the rotary motion to tangential motion achieved between the pinion gear 32 and rack 26 or drive sprocket 50, timing belt 36, and timing belt rack 26. The motion profile of the mover 24 traveling along the path P can be controlled to provide a desired tangential force at the mover 24. This tangential force can be used to accelerate the mass of the mover 24 and a payload. This tangential force can be used to apply thrust from the mover 24 to an external element such as process tooling. Tangential force available in a region along the track 22 at mover 24 can be increased by addition of a rotary motor 40 capable of more torque or changes to the final drive ratio of the mechanical drive train. The tangential force at the mover 24 can also be increased by contacting rack 26 by more than one drive element 30 and more than one rotary motor 40. Hence it is possible to locally tailor the force available along the path P of track 22. This can allow use of lower cost rotary motors 40 with lower available torque where high tangential forces are not needed.

More specifically, a first mover 24-1 is mechanically engaged by a first drive element 30-1 so that the rotational velocity of the first drive element 30-1 prescribes the tangential velocity of the first mover 24-1. Any changes to the rotational position, velocity, and acceleration of the first drive element 30-1 result in proportional changes in tangential position, velocity, and acceleration of the first mover 24-1.

As the first mover 24-1 travels, it encounters and is mechanically engaged by a second drive element 30-2 with a rotary velocity and position synchronized at equal tangential velocity as the first drive element 30-1 and with the drive element 30-1 gear teeth synchronized with rack 26-1 teeth. The movement and velocity of the first mover 24-1 is controlled by the synchronized rotational position, velocity, and acceleration of combined first and second drive elements 30-1 and 30-2.

As the first mover 24-1 travels, the first drive element 30-1 disengages the first mover 24-1. The first mover 24-1 will then only be controlled by the second drive element 30-2. The rotational velocity and phase of the first drive element 30-1 is adjusted to match tangential velocity and phase of rack teeth of the second mover 24-2.

Figure 2A:
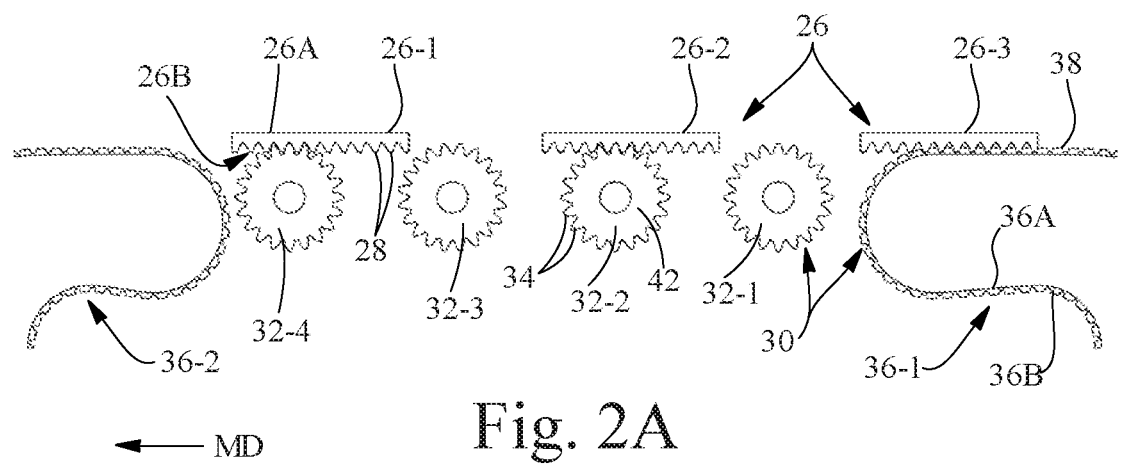
FIG. 2A is an enlarged, partially fragmented side view of a portion of the apparatus of FIG. 1 showing gear racks for joining to the surface of movers, and the pinions and toothed belts (only portions of the toothed belts are shown) that engage with the gear racks.
Figure 2B:
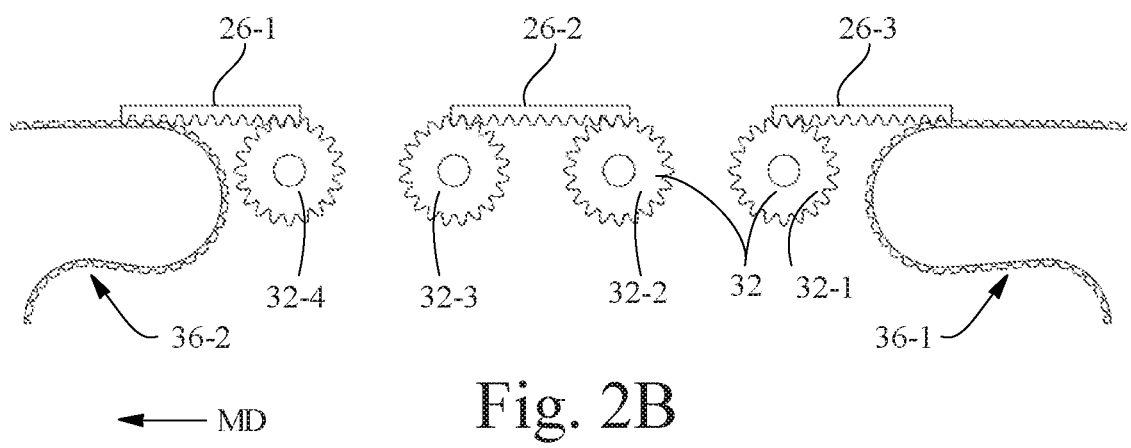
FIG. 2B is an enlarged, partially fragmented side view of a portion of the apparatus, similar to that shown in FIG. 2A, showing a progression in movement of the movers from right to left.
Figure 2C:
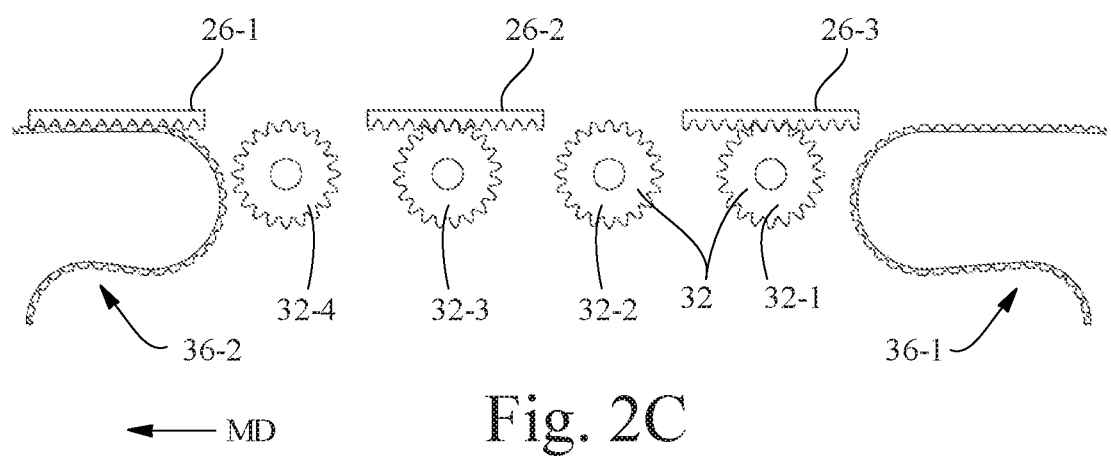
FIG. 2C is an enlarged, partially fragmented side view of a portion of the apparatus, similar to that shown in FIG. 2A, showing a further progression in movement of the movers from right to left.

FIGS. 2A-2C are close-up views of a portion of the apparatus 20 that show, among other things, the gear racks 26 that will be joined to the inner surface of movers 24 (the movers are not shown for simplicity). These figures also show the pinions 32 and toothed belts 36 (only portions of the belts are shown) that engage with the gear racks 26. The racks 26, as noted above, have a first or outer surface 26A, and a second or inner surface 26B. The inner surface 26B of the racks 26 have a plurality of teeth 28 thereon. These teeth 28 may engage with the teeth 34 on the surface of the pinion gears 32. The belts 36 have a first or inner surface 36A, and a second or outer surface 36B. The outer surface 36B of the belts 36 have a plurality of teeth 38 thereon. These teeth 38 may engage with the teeth 28 on the inner surface 26B of the racks 26. FIGS. 2A-2C show a progression of movement of three racks, 26-1, 26-2, and 26-3, from right to left in the machine direction (MD). As shown in FIGS. 2A-2C, each pinion 32 will only contact one rack 26 at any time. If the pinion 32 contacted two racks 26 they would not be able to have relative motion therebetween. The racks 26 will typically contact either one pinion 32 or toothed belt 26, but during transfers, the racks 26 can contact two drive elements 30, which may be pinions 32 and/or toothed belts 36.

FIG. 4 shows two of the toothed belts 36-1 and 36-2 in greater detail. As shown in FIG. 4, portions of inside surfaces of the belts will wrap around a plurality of guide rollers 60, which support the belts. The belts 36-1 and 36-2 are supported parallel to the path P to ensure engagement of the belt teeth 38 and teeth 28 on the rack 26 associated with the mover 24 to enable tangential driving of the movers 24 without jumping and/or disengagement of the teeth. As shown in FIG. 4, all of the teeth 28 on the racks 26 do not have to be in engagement with the teeth 38 on the toothed belts 36-1 and 36-2. For instance, as the racks 26 travel around the curved portion 22B of the track, the toothed portions at the ends of the racks 26 may not be engaged with the teeth on the belts due to the flat, plate-like configuration of the racks (and the curved configuration of the adjacent portion of the belts). It is only necessary that some of the teeth are in engagement.

Figure 5:
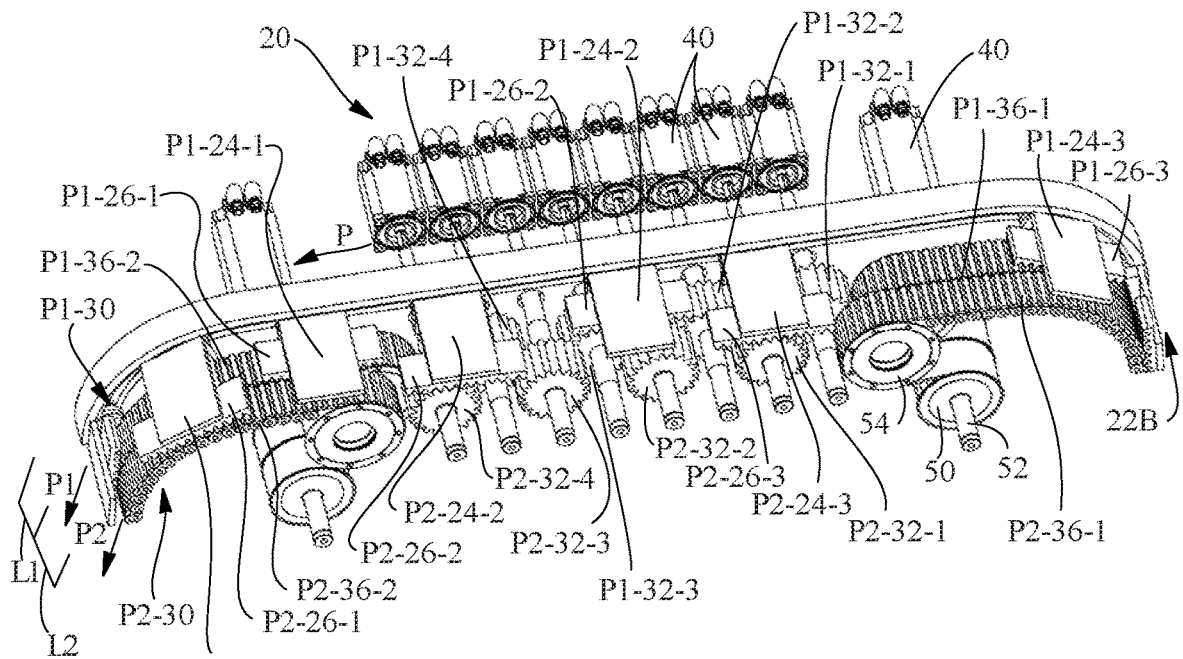
FIG. 5 is an enlarged fragmented top perspective view of the apparatus shown in FIG. 1 that shows the gear racks and pinions, and portions of the belts, in greater detail.

FIG. 5 shows an embodiment of the gear racks 26 and pinions 32 in greater detail where the movers 24 are moved along parallel paths P1 and P2 with parallel systems of drive elements 30. The components of the apparatus 20 shown in FIG. 5 will be designated by reference numbers that specify the path in which the component is located as a prefix, and a hyphen followed by similar reference numbers used previously with respect to each component. For example, FIG. 5 shows the movement of racks, P1-26-1, P1-26-2, and P1-26-3 generally referred to as P1-26 and P2-26-1, P2-26-2, and P2-26-3 generally referred to as P2-26, respectively (and associated movers P1-246-1, P1-24-2, and P1-24-3 generally referred to as P1-24 and P2-24-1, P2-24-2, and P2-24 generally referred to as P2-24-3) in an arrangement where the movers P1-24 and P2-24 are moved along parallel paths P1 and P2 with parallel systems of drive elements P1-30- and P2-30. As shown in FIG. 5 in path P1, each pinion P1-32 will only contact one rack P1-26 (and associated mover P1-24) at any time. If the pinion P1-32 contacted two racks (and movers P1-24), the different racks P1-26 would not be able to have relative motion. The racks P1-26, on the other hand, will typically contact either one drive element P1-30, and during transfers, two drive elements P1-30 (e.g., pinions and/or belts). Likewise in path P2, each pinion P2-32 will only contact one rack P2-26 (and associated mover P2-24) at any time. If the pinion P2-32 contacted two racks (and movers P2-24), the different racks P2-26 would not be able to have relative motion. The racks P2-26, on the other hand, will always contact either one drive element P2-30, and during transfers, two drive elements P2-30 (e.g., pinions and/or belts). Racks P1-26 from path P1 will not engage with pinions P2-32 from path P2. And likewise, racks P2-26 from path P2 will not engage with pinions P1-32 from path P1. The motion of racks P1-26 are independent of racks P2-26. It is possible for a rack P1-26 from path P1 and a rack P2-26 from path P2 to overlap during their motion. The term "overlap", as used herein, means that the racks 26 have portions that are coextensive in the machine direction along the path. It does not require that one rack overlie a portion of another rack. This makes it possible for a mover P1-24 to move in close proximity with or come in contact with an adjacent mover P2-24. Movers are shown to alternate sequence between paths P1 and P2. For example movers are shown in machine direction sequence from left to right starting with P2-24-1, then P1-24-1, P2-24-2, P1-24-2, P2-24-3, and finally P1-24-3. It is possible to configure the system in any desired order of sequences such as P1-24-1, P1-24-2, P2-24-1, P2-24-2, P1-24-3, and P2-24-3 or P1-24-1, P1-24-2, P12-24-3, P2-24-1, P2-24-2, and P2-24-3. It is also possible to configure the movers P1-24 to follow path P1 only and engage with only a single lane of drive elements P1-30. The drive system can also be configured to include any number of parallel paths P1, P2, P3, P4, P5, P6, ore more and movers P1-24, P2-24, P3, 24, P4-24, P5-24, P6-24, or more.

FIG. 6 shows the rotary servo motors 40 that drive the pinions 32 (shown in FIG. 5) and toothed belts 36-1 and 36-2. In this particular embodiment, there are a plurality of rotary servo motors 40A that are located along the linear portions 22A (along the sides of the track) that drive the pinions 32. There are also two rotary servo motors 40B that are located inward of the ends 22B of the track, each of which drives one of the belts along the curvilinear portions 22B at the ends of the track.

Numerous alternative embodiments are possible.

Figure 7:
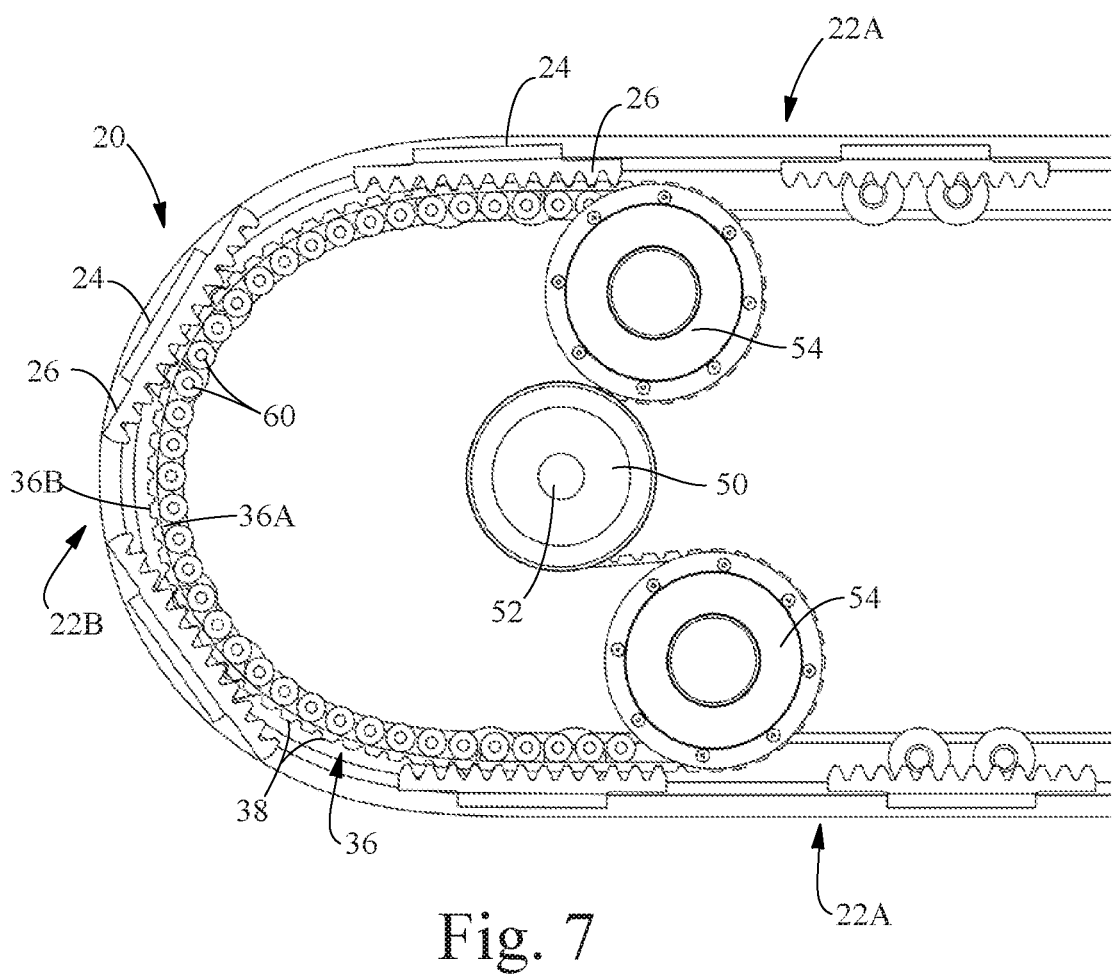
FIG. 7 is an enlarged fragmented side view of one of the ends of an apparatus similar to that shown in FIG. 1 in which the curvilinear ends of the track are in the form of a polynomial spline curve.
Figure 8:
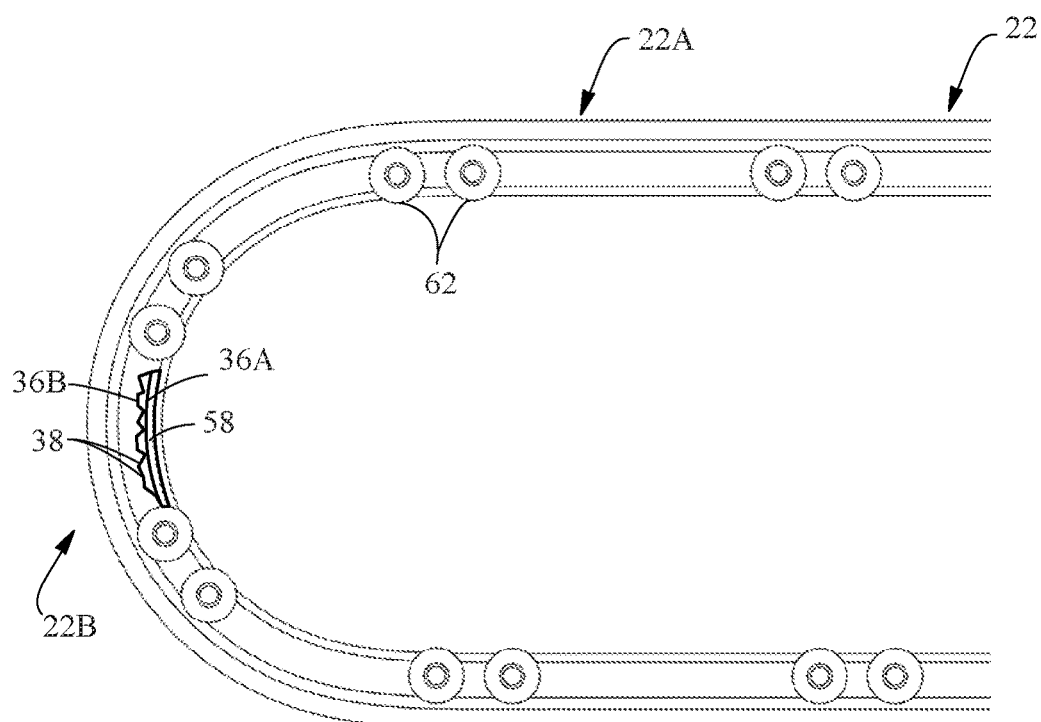
FIG. 8 is a further simplified side view of one of the ends of an apparatus in which the curvilinear ends of the track are in the form of a polynomial spline curve.

FIGS. 7 and 8 show that in certain cases, the ends 22B of a race track configured track 22 may be in the form of a polynomial spline curve, such as a fifth order polynomial spline curve. This provides a smoother transition (in transition portions or "transitions") between the linear sections 22A of the track and the curved sections 22B of the track at the ends of the track. This greatly reduces the stresses due to acceleration and jerk on the movers 24 as they travel into, around, and out of the curved sections of the track at the ends 22B of the track. As shown in FIG. 7, the portion of the belt 36 along the polynomial spline curve can be supported by a plurality of closely-spaced rollers 60 that may, but preferably do not, contact each other. The placement of rollers 60 ensures that the belt 36 will follow the prescribed spline path of the track and movers 24.

FIG. 8 shows a simplified alternative view of the ends 22B of a race track configured track 22 shown in FIG. 7. Components have been removed for clarity to show only the track 22 and the support rollers 62 that would be part of movers 24 as they travel around the track 22. A short fragmented portion of a belt 36 is shown. The end 22B track 22 in FIG. 8, follows a fifth order polynomial spline curve and the linear sections 22A follow a straight line. As shown in FIG. 8, at least a portion of the back 36A of the belt 36 can be supported by one or more stationary curvilinear backing plates 58. The backing plates 58 can employ low friction materials such as ultra-high molecular weight polyethylene or TEFLON® synthetic resin. The backing plates 58 can also use compressed air to flowing through small orifices to float the belt across the backing plate 58.

Figure 9:
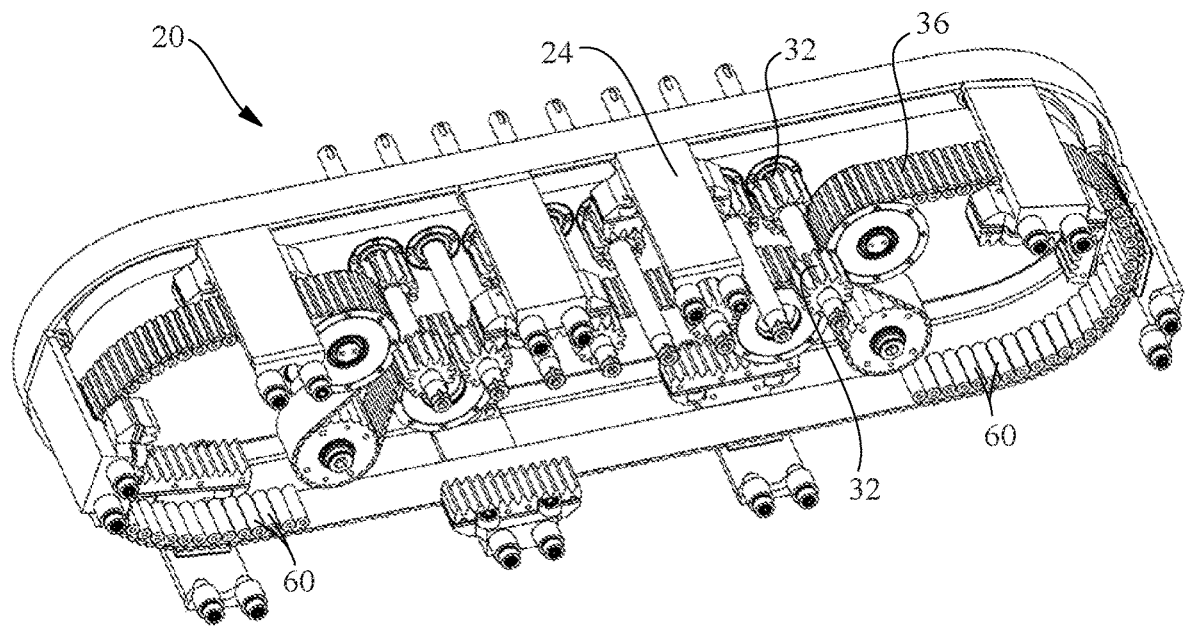
FIG. 9 is a top perspective view of a variation of the apparatus shown in FIG. 1 that uses movers with gear racks for engaging pinion gears and separate belt racks for engaging toothed belts.

FIG. 9 shows an embodiment of an apparatus 20 which uses movers 24 that have both gear racks for engaging pinion gears 32 and separate belt racks for engaging timing belts 36. This allows use of off-the-shelf commercial racks such as racks for CP20 gears and AT20 timing belts. In FIG. 9, the timing belt 36 is in a central lane with pinion gears 32 on either side. While two lanes of pinion gears 32 are shown, other numbers of pinion lanes can be used such as 1, 2, 3, 4, 5, 6, 7, 8, 9, 10, etc.

Figure 10:
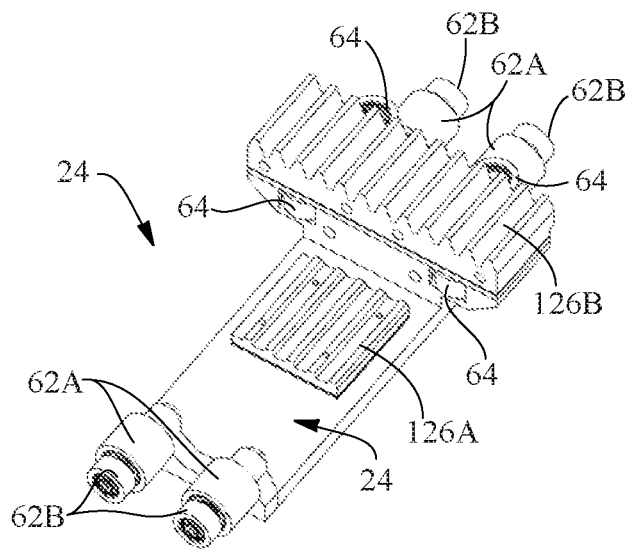
FIG. 10 is an enlarged perspective view that shows a mover with two racks.

FIG. 10 shows a mover 24 with two racks (that can be used in the embodiment shown in FIG. 9) in greater detail. The timing belt rack 126A is in the center and the gear rack 126B is closer to the support rollers 62. The bearing system for this embodiment uses four sets of horizontal rollers 62A to 62B to support the mover 24 in the track 22. Larger inner rollers 62A will engage the outer track surface to carry the centrifugal forces and the smaller inner rollers 62B will engage an inner track surface. Four vertical rollers 64 are used to position the mover in the cross machine direction and carry moments in the horizontal plane. Any of the rollers can be adjusted using an eccentric to adjust clearance or preload with the track.

FIG. 11 shows an alternative embodiment of an apparatus 20 which is provided with multiple drive belts, 36-1, 36-2, 36-3, and 36-4, for controlling the motion profile of movers 24 traveling around a curved section 22B of track 22 and allowing independent relative motion of the movers 24 around the curved sections 22B of the track 22. In this embodiment, dual lanes of interleaving drive belts are used to drive a common belt rack 26 connected to a mover 24. Referring to FIG. 11, the two adjacent parallel groups of belts 36-1 and 36-2 nearest the cam track plate 68 can be engaged with the mover (upper right hand mover) 24-1. In the embodiment illustrated, a total of four independent belts 36-1, 36-2, 36-3, and 36-4 are used to transport the mover 24 around a curved section of track. These belts are configured to follow the curvature of the mover path P and can be supported by a plurality of rollers, backing plates, or a combination of backing plates and rollers. Each of these drive belts 36-1, 36-2, 36-3, and 36-4 can be driven by an independent servo motor. A combination of multiple discrete belts can also be driven by a single servo axis. When the mover belt rack is engaged by only one drive belt, the belt drive axis can be accelerated to create relative motion between the mover 24 and any other nearby movers 24 traveling along the path. Motion of interleaved adjacent drive belts can be synchronized so that the mover belt rack smoothly transitions between the belts. Driving a mover 24 around a curved path at a constant belt tangential velocity can require high amounts of driving force and energy. This is due to the center of mass of the mover 24 accelerating due to the increased path length for curved regions at a higher radius of curvature outside the belt path. Multiple independent control regions by multiple belts around the curved path make is easier to adjust the tangential velocity of each mover 24 as it travels around the curved path. This can enable keeping a constant or nearly constant tangential velocity for the center of mass of the mover which reduces acceleration and required driving force. Any practical number of drive belts can be employed, and in some embodiments it may be beneficial to have combinations of three, four, or more belts in selective engagement with a mover rack. Likewise, it might be beneficial to configure the belts to have 2, 3, 4, 5, 6, 7, 8, 9, 10, 11, 12, or more independent belts to drive the mover through a track curve. Independent belt drive segments can also be configured to follow a straight sections of track. Multiple belts in straight track sections can be interleaved to enable relative mover between adjacent movers using the same principle as the rack and pinion gearing. Motion of a mover around a complete track system can be controlled by engagement by a plurality of timing belts with no gear racks in use. The motion of a mover around a track system can also be accomplished by any combination of gear racks and discrete segments of toothed (e.g., timing) belts that engage with and follow the path of a mover 24. Belt racks for adjacent movers can alternate between two or more lanes. FIG. 11 shows an embodiment with racks in two parallel lanes. The outer two adjacent parallel groups of belts farthest from the cam track plate, 36-3 and 36-4, engage with movers in a second lane. Movers in the first and second lane are under the control of different drive motors and are continuously able to have prescribed relative motion.

Figure 12:
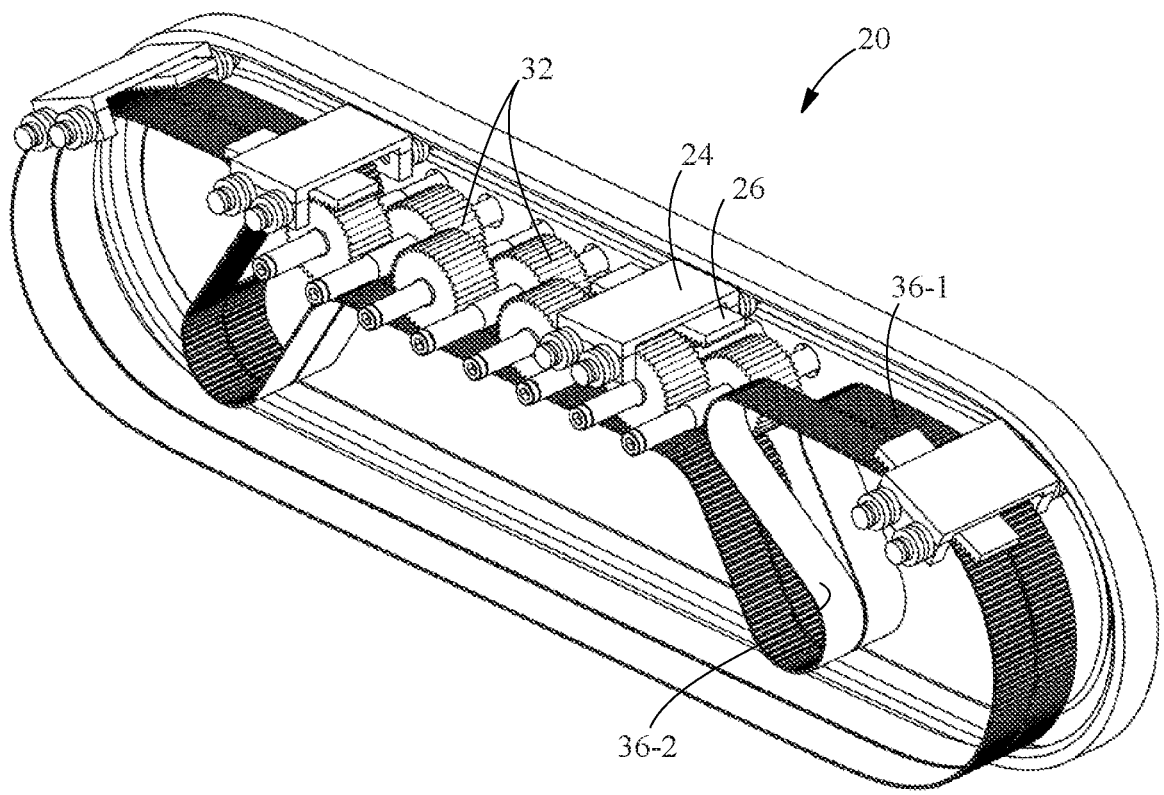
FIG. 12 is a schematic front perspective view of an alternative embodiment of an apparatus which is provided with a shared rack that engages a timing belt and a pinion gear.
Figure 13:
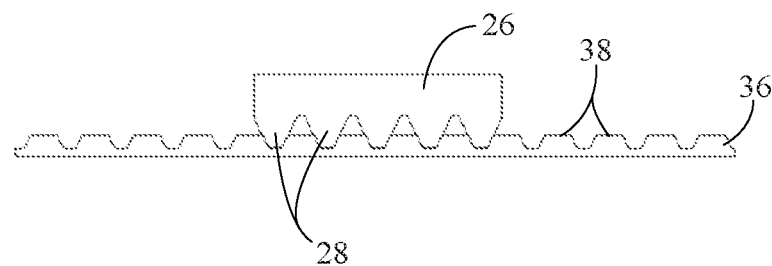
FIG. 13 is a schematic side view showing an enlarged detail of the interaction of the timing belt and the rack.
Figure 14:
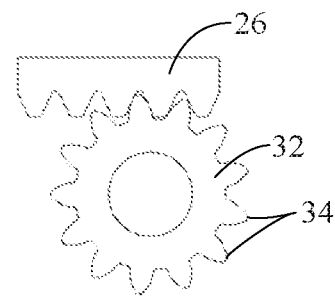
FIG. 14 is a schematic side view showing an enlarged detail of the interaction of a pinion with a rack.
Figure 15:
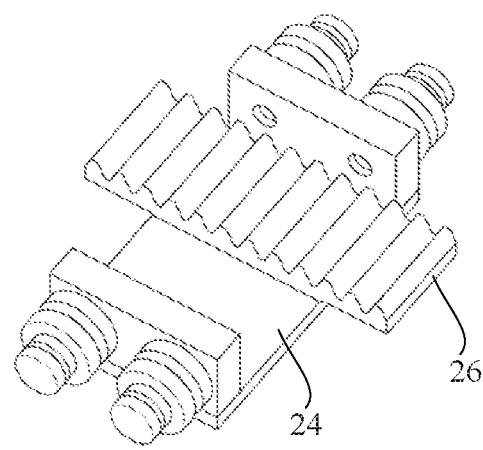
FIG. 15 is an enlarged perspective view of a mover with a single rack for sharing between belts and pinions.

FIG. 12 shows an alternative embodiment of an apparatus 20 which is provided with movers 24 with a shared rack 26 that engages both a timing belt (such as belt 36-1 or belt 36-2) and pinion gears 32. FIG. 13 shows an enlarged detailed view of the interaction of the timing belt 36 with the rack 26. The rack teeth 28 can be cut to fit with a standard timing belt tooth profile such as BRECOFLEX AT10™ polyurethane timing belt available from BRECOflex Co., LLC of Eatontown, N.J., U.S.A. FIG. 14 shows an enlarged detailed view of the interaction of the pinion 32 with the rack 26. The rack gear teeth 34 can be cut to fit with the tooth profile in the rack 26. FIG. 12 illustrates that sharing the rack between the timing belt (such as belt 36-1 or belt 36-2) and pinions 32 can result in a reduced width for the system due to no need for dedicated lanes for both belt and gear racks. FIG. 15 shows the narrower simplified mover 24 with a single rack 26 for sharing between belts and pinions. The bearing system uses four sets of V-rollers to positions the mover with the track. Larger inner V-rollers will engage an outer track smaller inner V-rollers will engage an inner track.

Figure 3A:
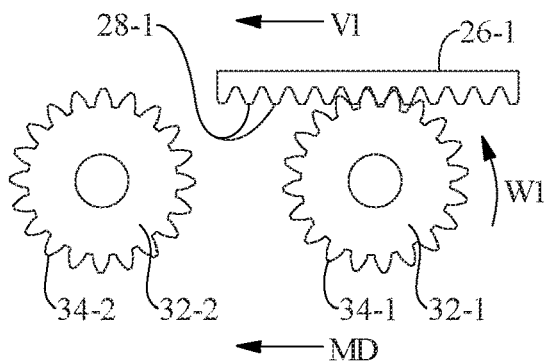
FIG. 3A is the first of several figures that is an enlarged simplified schematic side view of a portion of an apparatus showing three pinions and at least one rack. This set of figures will show the progression of movement of the rack(s) from right to left.
Figure 3A:
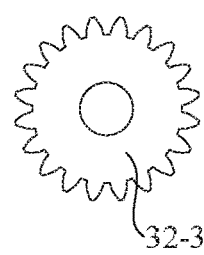
Figure 3B:
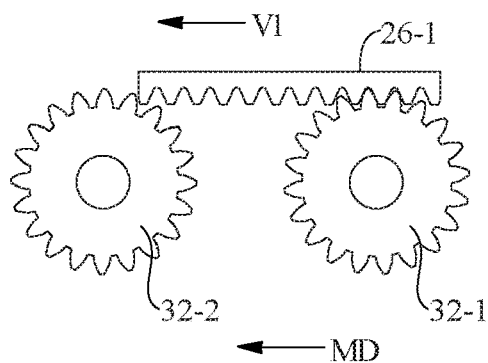
FIG. 3B is an enlarged simplified schematic side view of a portion of an apparatus shown in FIG. 3A which shows a further progression of movement of the rack(s) from right to left.
Figure 3B:
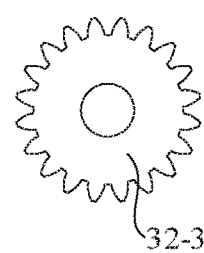
Figure 3C:
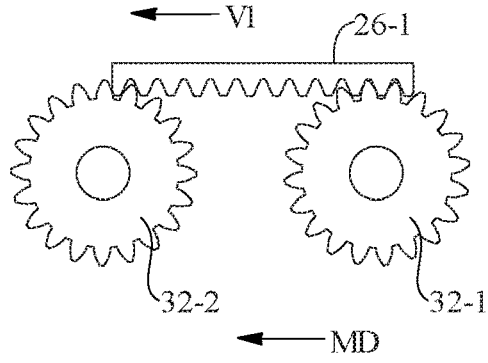
FIG. 3C is an enlarged simplified schematic side view of a portion of an apparatus shown in FIG. 3A which shows a further progression of movement of the rack(s) from right to left.
Figure 3C:
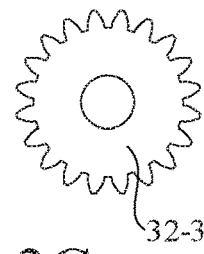

FIGS. 3A through 3H show an example of a linear sequence of racks and pinions in a single lane. These figures show a simplified series of three pinions, 32-1, 32-2, and 32-3 and one or two racks, 26-1 and 26-2. The racks 26-1 and 26-2 are traveling (that is, they are being moved in a machine direction, MD) from right to left. For illustrative purposes for FIGS. 3A through 3H, the racks 26-1 and 26-2 will enter from the right at velocity V1 and exit to the left at velocity V3. The racks are decelerated such that exit velocity V3 (shown in FIG. 3G) is less than entrance velocity V1. The spacing, 51, S2, and S3, measured along the path between periodic racks is subsequently decreased from the entrance to the exit. Referring to FIG. 3A, at the entrance to the right, the velocity of rack 26-1 is controlled at constant velocity V1 by the first pinion 32-1 rotating at constant rotational velocity oil. Rack 26-1 moves at constant velocity V1 from right to left and rack 26-1 approaches the second pinion 32-2 as shown in FIG. 3B. Prior to transfer, the rotational velocity of the second pinion 32-2 is adjusted to equal the rotational velocity of the first pinion 32-1. Also prior to transfer, the position of the gear teeth 34-2 for the second pinion 32-2 are rotated so their position is synchronized to mesh with the gear teeth 28-1 of rack 26-1. In FIG. 3C, as rack 26-1 travels to the left, rack 26-1 is transferred at constant velocity V1 to the second pinion 32-2 with mesh of gear teeth synchronized. During the time of transfer, the first pinion 32-1 and the second pinion 32-2 are both rotating at constant rotational velocity oil. There is preferably some overlap time where rack 26-1 is engaged by both the first pinion 32-1 and the second pinion 32-2. As rack 26-1 continues to travel from right to left, the rack 26-1 will no longer be engaged by the first pinion 32-1.

Figure 3D:
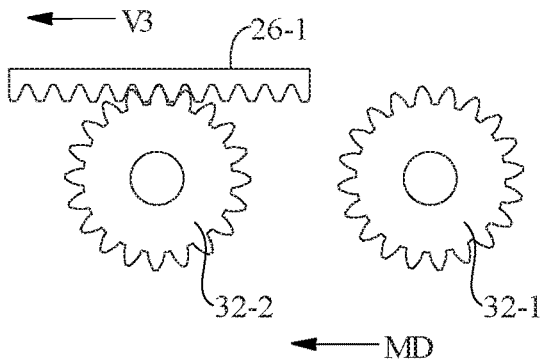
FIG. 3D is an enlarged simplified schematic side view of a portion of an apparatus shown in FIG. 3A which shows a further progression of movement of the rack(s) from right to left.
Figure 3D:
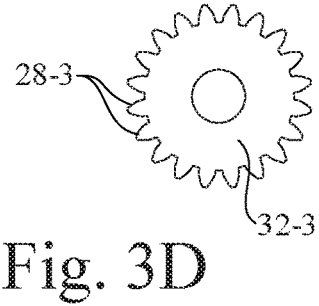
Figure 3E:
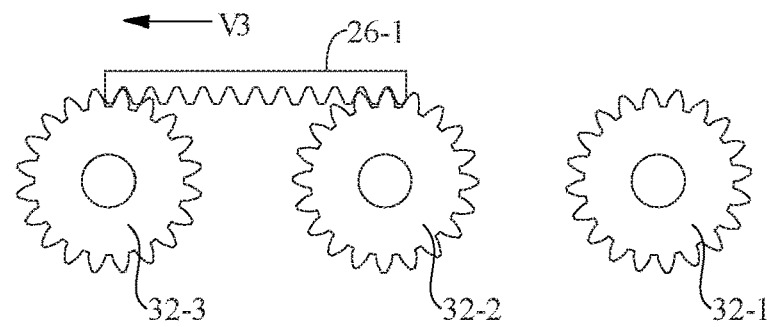
FIG. 3E is an enlarged simplified schematic side view of a portion of an apparatus shown in FIG. 3A which shows a further progression of movement of the rack(s) from right to left.

In FIG. 3D, when rack 26-1 is engaged by the second pinion 32-2 alone, it is now possible to decelerate rack 26-1 to velocity V3. The rotational velocity of the second pinion 32-2 is decelerated. As rack 26-1 approaches the third pinion 32-3, it is moving at constant velocity V3. Prior to transfer, the position of the gear teeth rack 26-1 is synchronized to mesh with the gear teeth 28-3 of the third pinion 32-3. In FIG. 3E, after transfer of rack 26-1 to the third pinion 32-3, the rack 26-1 is moving at constant velocity V3 and the second pinion 32-2 and the third pinion 32-3 are both at matched rotational velocity. There is preferably some overlap time where rack 26-1 is engaged by both the second pinion 32-2 and the third pinion 32-3. As rack 26-1 continues to travel to the left, rack 26-1 disengages from the second pinion 32-2 and it is possible to adjust rotational velocity and gear tooth position for the second pinion 32-2.

Figure 3F:
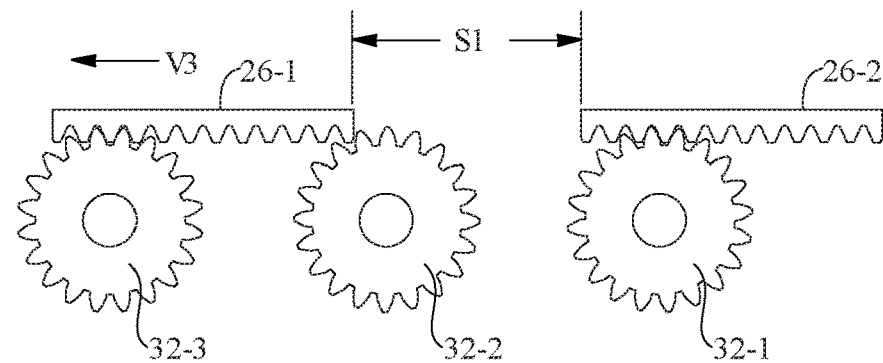
FIG. 3F is an enlarged simplified schematic side view of a portion of an apparatus shown in FIG. 3A which shows a further progression of movement of the rack(s) from right to left.
Figure 3G:
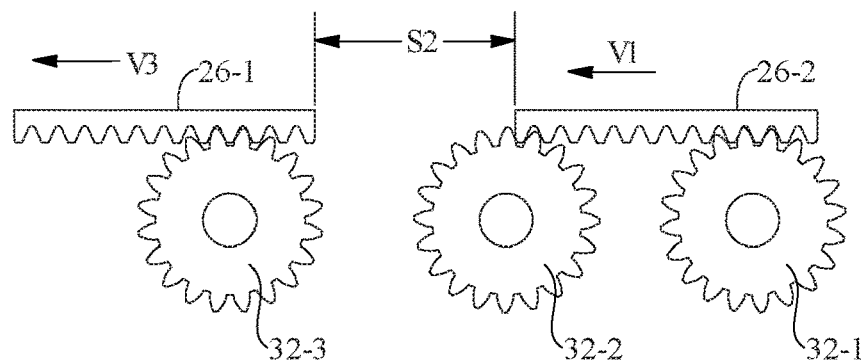
FIG. 3G is an enlarged simplified schematic side view of a portion of an apparatus shown in FIG. 3A which shows a further progression of movement of the rack(s) from right to left.
Figure 3H:
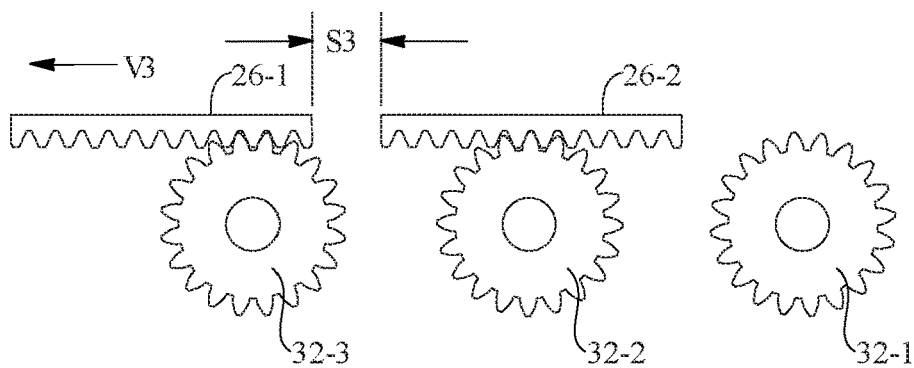
FIG. 3H is an enlarged simplified schematic side view of a portion of an apparatus shown in FIG. 3A which shows a further progression of movement of the rack(s) from right to left.

In FIG. 3F, while rack 26-1 is traveling at velocity V3 and engaged by the third pinion 32-3, the second rack 26-2 engaged with the first pinion 32-1 is traveling at velocity V1 which is a higher velocity than V3. As rack 26-1 disengages from the second pinion 32-2, the pinion 32-2 must be at tangential velocity V3. Before second rack 26-2 can engage with the second pinion 32-2, the rotational velocity of the second pinion 32-2 must be accelerated to tangential velocity V1. Referring to FIG. 3G, prior to transfer of the second rack 26-2 from the first pinion 32-1 to the second pinion 32-2, the rotational velocity of the second pinion 32-2 is adjusted to equal the rotational velocity of the first pinion 32-1. Also prior to transfer, the position of the gear teeth for the second pinion 32-2 are rotated so their position is synchronized to mesh with the gear teeth of the second rack 26-2. It will take some time to adjust the velocity of the second pinion 32-2. The time required to adjust rotational velocity and synchronization can be minimized by maximizing motor torque and minimizing rotational inertial and friction. In a practical system running at high velocity, the control system may also require some additional computational time beyond time dictated by physics. Because of the need to adjust the rotational velocity and position of the second pinion 32-2, it is necessary for there to be some space between the trailing end of the first rack 26-1 and the leading end of the second rack 26-2. Hence, it would not be possible for the ends of the first rack 26-1 and the second rack 26-2 to be adjacent and touching within a single lane. The first rack 26-1 and the second rack 26-2 must maintain a minimum spacing between racks dictated by the performance of the second pinion 32-2 rotating mechatronic system. In FIG. 3H, the second rack 26-2 is engaged by the pinion 32-2 alone, it is now possible to decelerate the second rack 26-2 to velocity V3. The rotational velocity of the second pinion 32-2 is decelerated. The first rack 26-1 continues to travel at velocity V3 and is controlled by engagement with the third pinion 32-3. Note that the distance and pitch between the first rack 26-1 and the second rack 26-2, S3, has decreased from FIG. 3F to FIG. 3H.

In other embodiments, the distance between the first rack 26-1 and the second rack 26-2 can be increased along any portion of the path P by adjusting the velocities of the pinions 32 in an opposite manner.

The mover 24 and the attached rack 26 may have any suitable machine direction lengths which (as shown in FIG. 4) are designated LM and LR, respectively. The machine direction length, LM, of the mover 24 can be the same as machine direction length, LR, of the attached rack 26. To maintain control of the mover 24 during transfer from sequential drive elements 30, the machine direction length, LR of the rack 26 must be greater than or equal to the minimum machine direction spacing between sequential drive elements 30. It is beneficial for the machine direction length, LR of the rack 26 to be greater than the length of the minimum machine direction spacing between sequential drive elements 30, to provide some overlap where both sequential drive elements are engage with the rack 26 during transfer. In this case, if the racks for two sequential movers travel in a single lane, it will be necessary to maintain a minimum gap between the movers 24 equal to the minimum gap required by sequential racks 26 in a single lane. Alternatively, the machine direction length LM of the mover 24 can be longer than the machine direction length, LR, of attached rack. In this case, if the difference in length of the mover 24 minus rack length exceeds the minimum distance required between racks 26 traveling in a single lane, it is possible to position movers very close to each other or even touching. Alternatively, the machine direction length LM of the mover 24 can be shorter than machine direction length, LR, of the attached rack 26. In this case, the minimum gap that can be achieved between sequential movers 24 is equal to the minimum gap between sequential racks 26 plus the difference in length between rack and mover.

It can be beneficial for the length LR of the rack 26 to exceed the machine direction length LM of the mover 24. This can reduce the total number of drive pinions 32 and drive motors 40 required to drive the movers 24 along a given path. This also enables movers 24 with very small MD lengths. Lengths as small as 40 mm or even 20 mm could be possible.

For some processes it might be desirable to plan the motion of sequential movers such that two or more movers are in close proximity or adjacent. Such would be the case if picking up a continuous stream of products queued at close spacing and then spacing them out to a larger pitch.

Figure 16A:
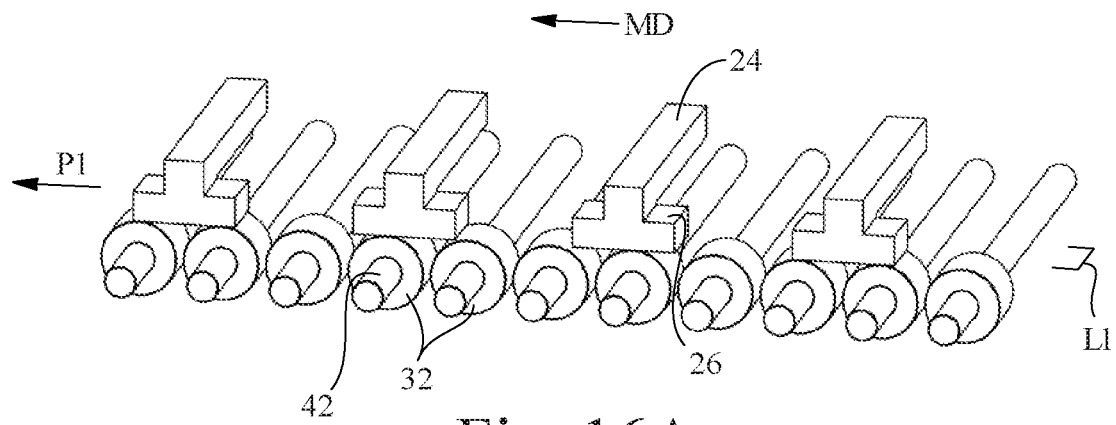
FIG. 16A is a schematic perspective view showing one embodiment of a portion of an apparatus having all of its pinions and racks in a single lane.
Figure 16B:
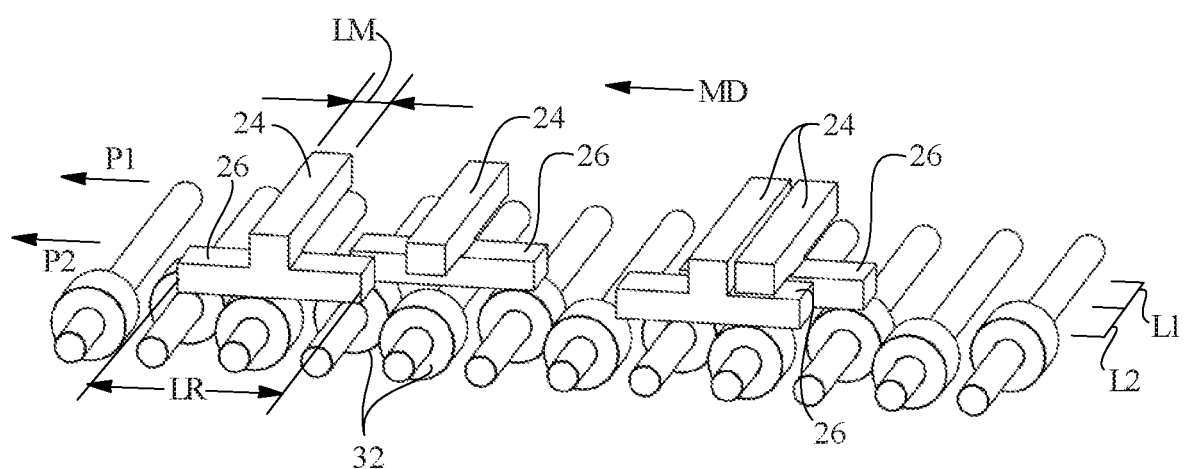
FIG. 16B is a schematic perspective view showing a portion of an apparatus having a configuration in which its pinions and racks that alternate between two lanes.
Figure 16C:
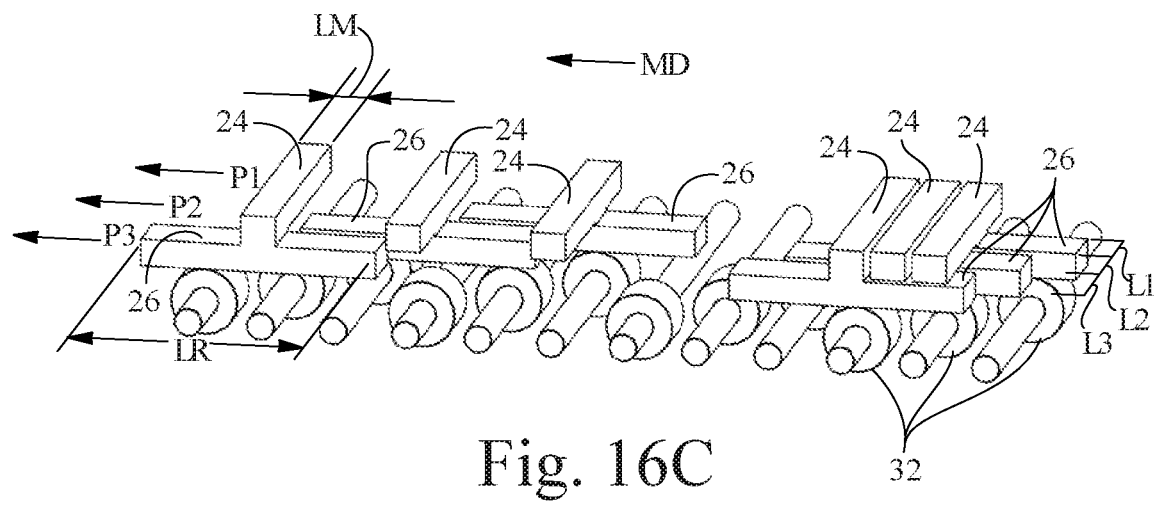
FIG. 16C is a schematic perspective view showing a portion of an apparatus having a configuration in which its pinions and racks that alternate between three lanes.
Figure 16D:
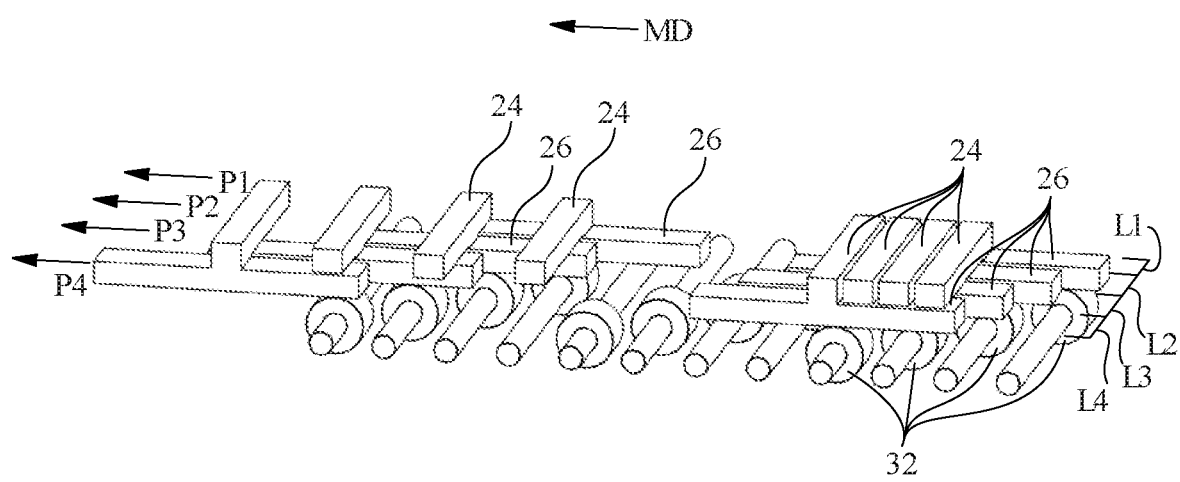
FIG. 16D is a schematic perspective view showing a portion of an apparatus having a configuration in which its pinions and racks that alternate between four lanes.

FIGS. 16A-16D are simplified schematic perspective views showing various embodiments of varying counts of parallel rack and pinion lanes following parallel paths P1, P2, P3, and P4. The teeth on the racks 26 and pinions 32 are not shown for simplicity. FIG. 16A shows an embodiment with all pinions 32 and racks 26 in a single plane which are in a single lane, L1. FIG. 16B shows an embodiment where pinions 32 and racks 26 alternate between two lanes, L1 and L2. FIG. 16C shows an embodiment where pinions 32 and racks 26 alternate between three lanes, L1, L2, and L3. FIG. 16D shows an embodiment where pinions 32 and racks 26 alternate between four lanes, L1, L2, L3, and L4. Although, the direction of movement (machine direction, MD) is shown from right to left in these figures, the MD can be from left to right in alternative embodiments.

The parallel pinion lanes enable close proximity of adjacent movers 24. The parallel pinion lanes provide time to adjust the velocity/timing of the pinions 32 for the next rack 26. As described in greater detail below, the number of adjacent movers 24 is equal to the number of parallel lanes. Such embodiments enable very small pitches including less than or equal to about 40 mm.

FIG. 16B shows an embodiment where pinions 32 and racks 26 alternate between two parallel lanes, L1 and L2. In the configuration illustrated, the machine direction length LR of the rack 26s is longer than the machine direction length LM of the attached movers 24. In this dual lane configuration, it is possible for the racks 26 in each of the two parallel lanes L1 and L2 to overlap each other. The dual lane drive configuration makes it possible to position to sequential movers 24 in very close proximity with each other, touching, or even interfering with or passing each other. In this configuration, it will not be possible to bring a third mover in sequence in close proximity of adjacent to the other two movers. This would require two racks 26 in the same lane to approach very close to each other and would not provide room for speed change of pinions 32 when disengaged from racks.

FIG. 16C shows an embodiment where pinions 32 and racks 26 alternate between three lanes L1, L2, and L3, and the racks 26 are longer than the attached movers 24 (LR is greater than LM). In this configuration, it is possible for racks 26 in the three parallel lanes L1, L2, and L3 to overlap each other and for two or three movers 24 in sequence to be in close proximity with each other.

FIG. 16D shows an embodiment where pinions 32 and racks 26 alternate between four lanes L1, L2, L3, and L4, and the racks 26 are longer than the attached movers 24 (LR is greater than LM). In this configuration, it is possible for racks 26 in the four parallel lanes L1, L2, L3, and L4 to overlap each other and for three or four movers 24 in sequence to be in close proximity with each other.

Figure 17A:
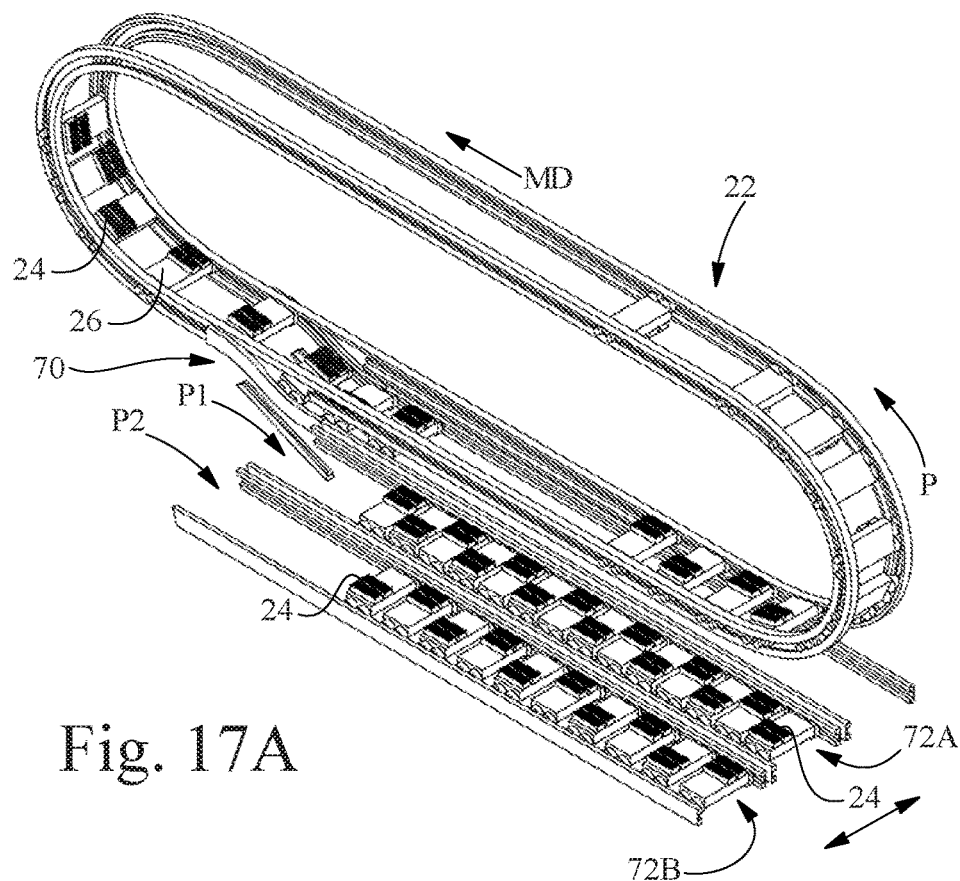
FIG. 17A is a perspective view of one embodiment of a track having paths which divert/merge.
Figure 17B:
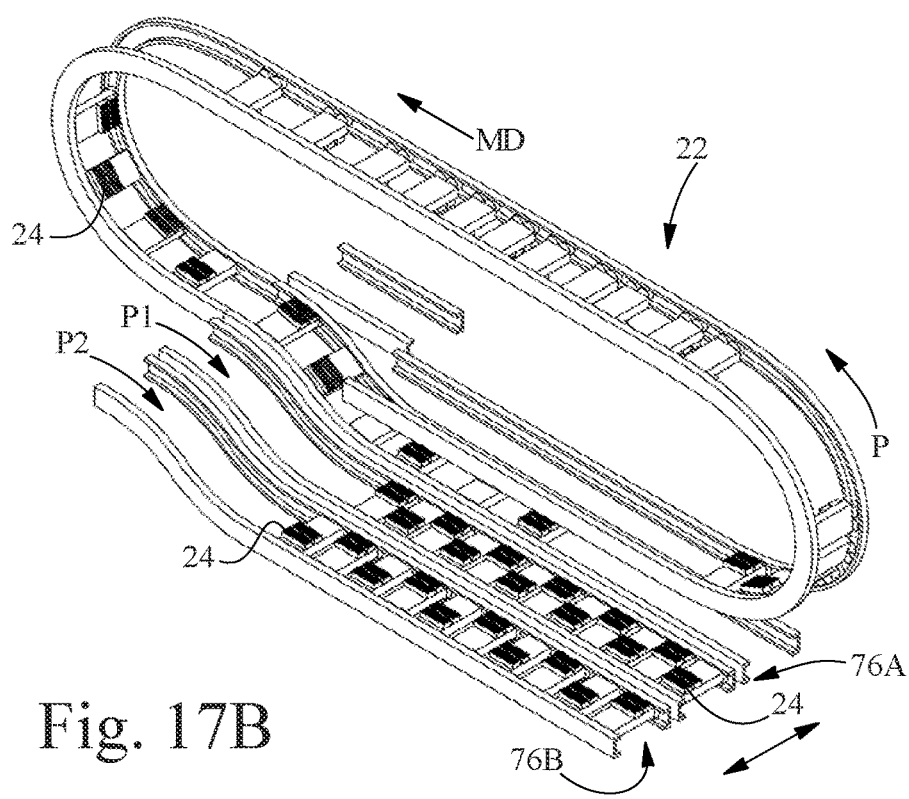
FIG. 17B is a perspective view of another embodiment of a track having paths which divert/merge.

FIGS. 17A and 17B show still other embodiments. FIG. 17A is a perspective view of one embodiment of a track 22 having multiple paths, P1 and P2, onto which the movers 24 can be diverted. When the pivoting track gate 70 is rotated up, the movers 24 will follow a closed ovoid primary path P around the closed ovoid track. When the pivoting track gate 70 is rotated down, a diverting path is opened from the ovoid track to the straight track below. Movers 24 rotating counter clockwise along the ovoid track can leave the ovoid track through the track gate 70 and are fed into the straight section 72A or 72B of track below. This can provide a convenient means for storing movers 24, for instance to change mover tooling or the number of movers on the track 22. Likewise, movers 24 in the straight section 72A or 72B of track can move from the straight section 72A or 72B of track and up the track gate 70 to the ovoid track. Multiple straight sections 72A and 72B of track and enable storage of different sets of movers 24 with differentiated tooling (that is, different features or configurations for holding articles) that might be used for making different sizes or types of products. The straight section connected to the track gate 70 can be selected by indexing the straight track sections in the direction orthogonal to the ovoid mover track 22 (as shown by the double-headed arrow). In addition to storage and retrieval from straight track sections 72A or 72B, a pivoting track gate 70 can be used to divert movers 24 between multiple tracks and could be used to create a network of alternative track routes.

FIG. 17B is an alternative embodiment of a track 22 having multiple paths, P1 and P2, onto which the movers 24 can be diverted. The track shown in FIG. 17B can be thought of as having a "side shift" feature. The parallel diverting tracks can be indexed orthogonally to mover path P to align a filler track segment 76A or 76B that will close the continuous path of the ovoid track 22. Indexing a diverting track in-line with the ovoid path will open the ovoid path and allow movers to divert between the ovoid path and the diverting track. This can allow diverting between the ovoid path and multiple diverting tracks. The diverting tracks can be used for storage of movers 24 with different tooling.

Figure 18:
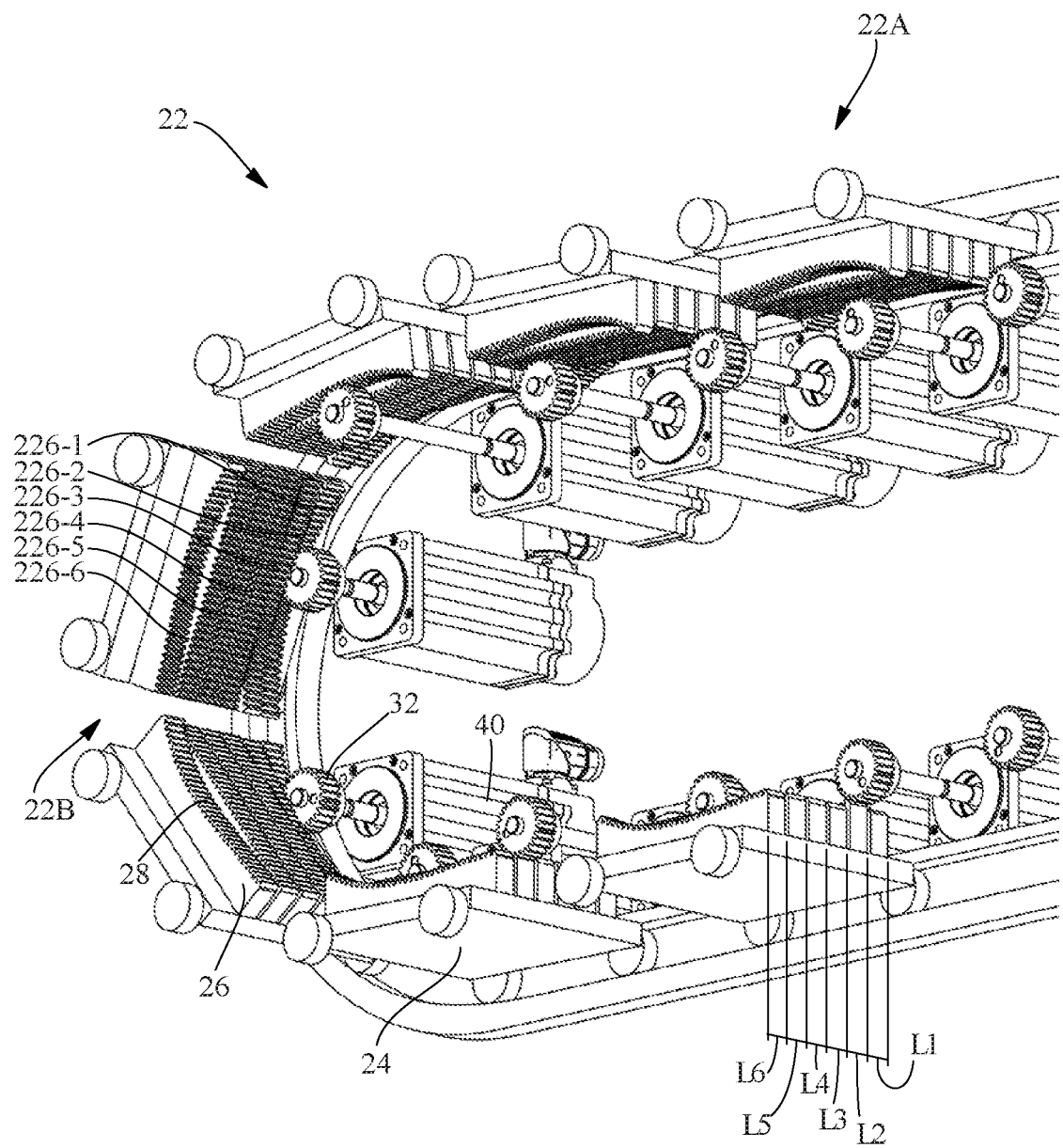
FIG. 18 is a fragmented perspective view of one end of an apparatus having curved gear racks that are driven by pinion gears for controlling the motion of movers traveling around the curved section of the track.

FIG. 18 illustrates an alternative embodiment for controlling the motion profile of movers 24 traveling around a curved section 22B of track and allowing independent relative motion of the movers 24 around the curved sections 22B of the track 22. Instead of multiple timing belts as in FIG. 11, the movers 24 are driven by stationary pinion gears 32 engaging with curved gear racks 26. The path of the gearing for each of the curved gear racks 26 is cut such that the rack 26 will remain engaged with the pinion gear 32 as the mover 24 travels along the curved path of the cam track. In the illustrated embodiment, there are a total of six unique rack shapes 226-1, 226-2, 226-3, 226-4, 226-5, and 226-6 that are arranged in six parallel lanes and attached to each mover 24. The drive pinions 32 connected to independent motors 40 around the track are also arranged in one of the six lanes corresponding to the six racks. Rack 226-3 is straight and can be driven by pinions 32-3 in straight sections of track 22. Rack 226-1 is curved at a constant radius and is driven by pinions 226-1 through the constant radius section of the track 22. The gearing for racks 226-2, 226-4, 226-5, and 226-6 follow engineered curves that allow pinion gears 32 in corresponding lanes to drive through the transition segments of the track that follow a polynomial spline. Racks 226-4 and 226-5 are shaped to maintain engagement with pinions 32-4 and 32-5 as the mover transitions between a straight section 22A of track to the spline curve section 22B. Racks 226-2 and 226-6 are shaped to maintain engagement with pinions 32-2 and 32-6 as the mover transitions between a spline curve section and a constant radius curve section of track. Some racks such as the straight and constant radius racks may be driven by multiple pinions in sequence. Some racks may only be driven by a single pinion until control of the mover is transitioned to pinions in another lane. The group of racks are transferred from pinion to pinion in sequence as the mover travels around the path of the track. The rotational position of each pinion gear is synchronized with the mating rack to enable a smooth and controlled transfer. Controlling the mover 24 by engagement of individual pinions 32 around the track 22 enables control of the motion profile of the mover 24 anywhere along the track 22 including the curved regions 22B. This can allow relative motion between adjacent movers 24 in the curved regions 22B. This can also allow adjusting the velocity along the track path P to maintain a constant tangential velocity of the mover 24 center of mass which greatly reduces the driving force required.

FIGS. 19-25 illustrate some examples of the many useful applications for the high performance independent mover drive technology described herein. The examples generally involve controlled transport of articles 10 carried by movers 24 along a path P and the controlled motion of discrete tooling 112 and 114 carried by movers 24 along a path P.

FIG. 19 illustrates an application for turning and re-pitching a component of an article 10. The apparatus 20 shown in FIG. 19 could, for example, be used to manufacture a baby diaper or other disposable products. An alternative turn and repitch embodiment to carry out this type of process is described in U.S. Pat. No. 8,720,666 which employs cam driven heads to acquire, adjust the pitch, rotate, and transfer a component of a baby diaper. In FIG. 19, the track structure has been omitted for simplicity. Referring to FIG. 19, a diaper chassis 10 enters from the right side and is transferred at matched speed to a vacuum head 80 and is held on by vacuum. The vacuum head 80 is rotably affixed to a mover 24. The vacuum head 80 is moving in the upward direction at a constant velocity in the figure. Vacuum applied through holes in the vacuum head 80 allows the article 10 to be securely held against the surface of the head selectively when the vacuum is applied. Note that the tangential matched speed transfer from the vacuum anvil roll 82 to the flat vacuum head 80 is very well controlled due to the natural tangential nature of the linear motion of the head 80 and mover 24 with a rotating cylindrical anvil roll 82. The vacuum anvil roll 82 is an example of an upstream apparatus 82 that will transfer the article 10 at matched tangential velocity to the vacuum head 80. Timing of vacuum to the vacuum head 80 can be controlled by a vacuum manifold or a control valve. To provide enough space to rotate the vacuum heads 90 degrees and to begin adjusting vacuum head 80 spacing to the desired downstream pitch, the mover 24 is accelerated by the rack and pinion drives as the mover 24 moves up to the timing belt drive 36. The timing belt drive 36 engages with the mover 24 and carries the vacuum head 80 around the upper curved section 22B of the track. While the mover 24 is travelling through the curve, the rotational angle of the vacuum head 80 is adjusted 90 degrees. Axis of head 80 rotation is orthogonal to the machine direction path of the mover 24. Rotation of the vacuum head 80 is optional and the apparatus could also repitch an article 10 without rotation or the apparatus could rotate the heads 80 only without repitching. Head rotation can be accomplished using any of the following: by interaction of a cam follower with a barrel cam; by cam follower interaction with a plate cam through a gear box as described in U.S. Pat. No. 8,720,666; by being driven by an electrical motor; or other means. When the mover 24 is transferred from timing belt 36 back to the pinion gear drive 32, the mover 24 and vacuum head 80 can be accelerated by pinion drives 32 to adjust to the desired pitch spacing and surface speed required for transfer to the downstream process. Again, transfer of the component to the downstream vacuum transfer roll 84 is at matched tangential velocity and is a controlled tangential transfer. The downstream vacuum transfer roll 84 is an example of a downstream apparatus 84. Vacuum applied to the vacuum head 80 can be shut off or transitioned to positive pressure at the region of transfer. This process is well controlled and lends itself to operate at very high speeds. Because of the superior force and acceleration capability of this technology it is feasible to carry and accelerate the mass of a turning head and components at very high rates of speed compatible with disposable product assembly machines. After component transfer, the mover heads continue along the track and adjust pitch and head rotation to pick up the next component. An advantage of this embodiment versus a machine requiring a size specific cam such as U.S. Pat. No. 8,720,666 is that the size of the product can be changed by adjusting the motion profiles specified in software versus changing a cam or interchanging a large piece of equipment. In fact, the turn and repitch embodiment described herein is capable producing many different sizes of product by making a simple recipe change in the motion control software. In addition to discharging components at constant pitch and frequency, it is possible to adjust the deposition frequency electronically to actively change the discharge pitch or to deposit components on demand. Likewise, it is possible to electronically control the timing for acquisition of components to pick up components of varying or uncertain pitch and to acquire on demand. The head cover can be exchanged for a smaller head cover or the shape of the active vacuum area on the head can be adjusted. This in combination with software adjustments further can enable different sizes of products. Clearly, an electronic turn and repitch apparatus employing this principle can be reconfigured to accomplish many tasks such as simply adjusting pitch only without turning or turning an angle other than 90 degrees. Adjustments to the process by software can enable instantaneous and even active adjustments to product format and sizes.

Figure 20:
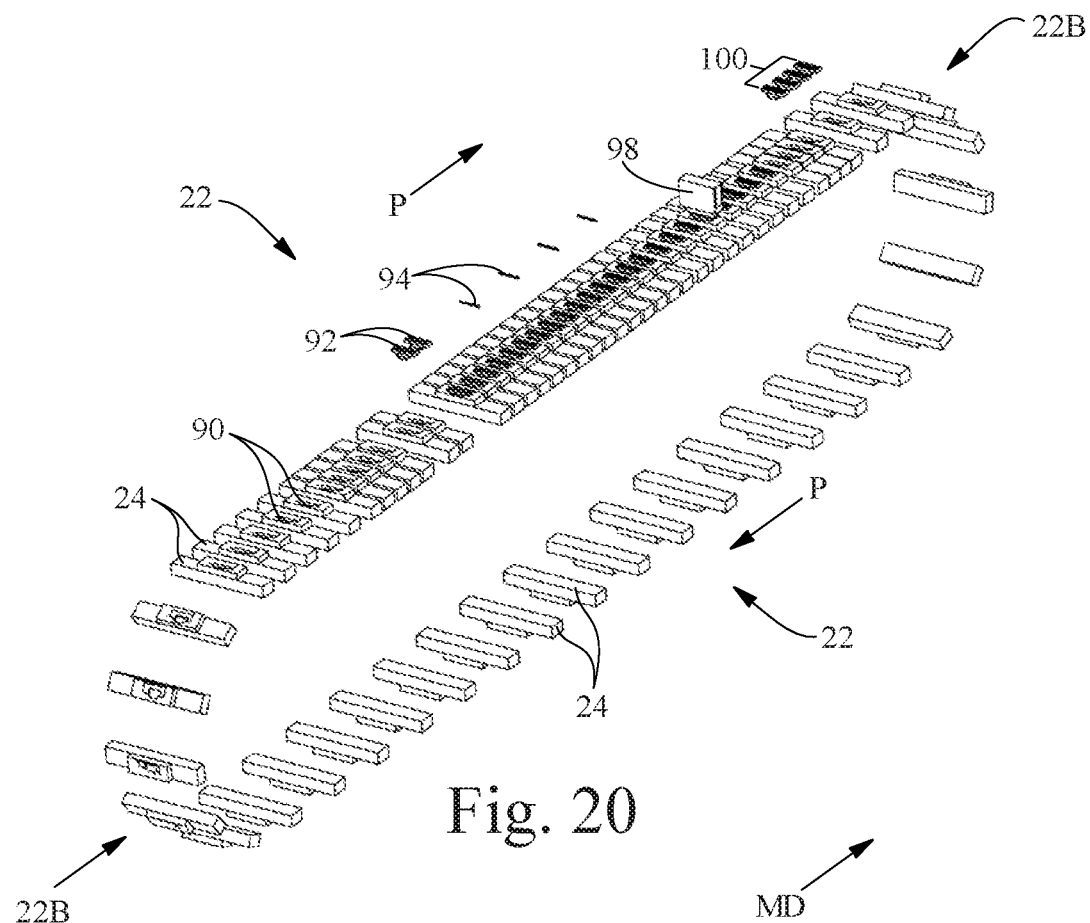
FIG. 20 is a perspective view of a portion of an exemplary discrete component assembly application using the independent mover drive technology (with various components not shown for simplicity).
Figure 21:
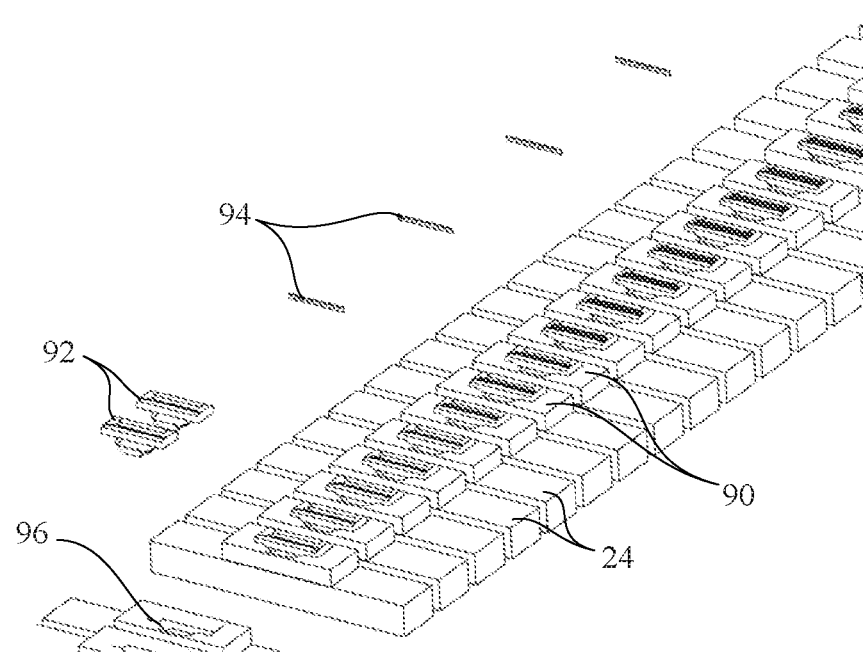
FIG. 21 is an enlarged fragmented perspective view of a portion of the apparatus shown in FIG. 20.
Figure 22:
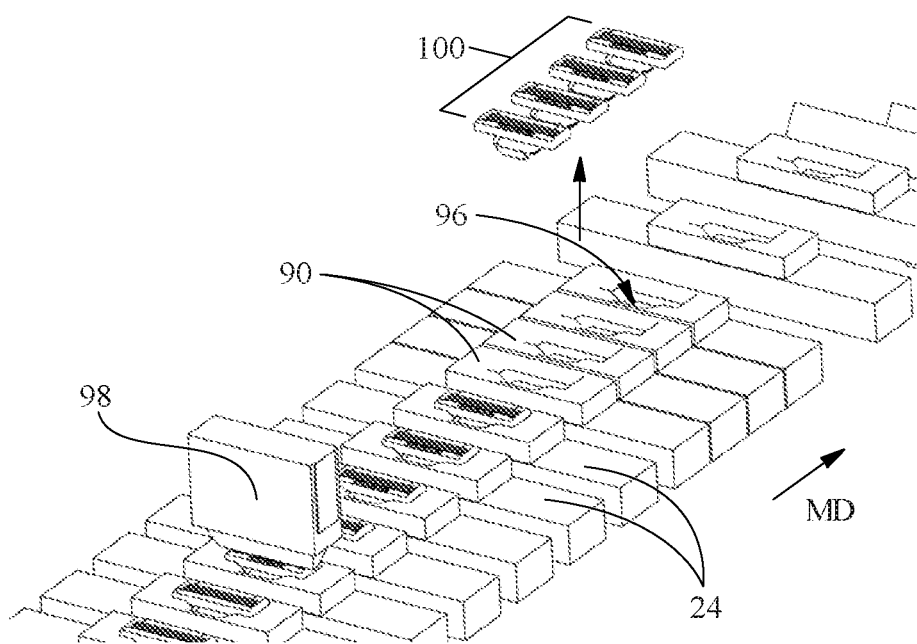
FIG. 22 is a further enlarged fragmented perspective view of a portion of the apparatus shown in FIG. 20.

FIGS. 20-22 illustrate an exemplary discrete component assembly apparatus with multiple assembly zones using the controlled motion system 20. FIGS. 20-22 are simplified schematic views that only show the movers 24. The racks, drive elements, and motors in FIGS. 20-22 are not shown for simplicity, but would be in the form shown and described in conjunction with the preceding figures herein.

FIG. 20 shows the continuous clockwise closed loop path P followed by a plurality of movers 24. Each mover 24 is configured to carry a carrier tool 90 to carry an individual article 10. In this example, the article 10 is a disposable razor cartridge, but it could be any discrete component or product. Likewise, each mover 24 could carry any number of multiple products or components. The top of the path P in this example is an active assembly zone and consists of decoupled indexing and continuously variable motion regions. The curves 22B and bottom of the path P constitute a return path with controlled motion. Of course, such an assembly machine could use the bottom portion of the path to complete assembly steps in addition to the top portion. Alternatively, the track 22 could be oriented so that the straight sections are vertical which can further enable assembly steps on both straight sides of the track. Assembly steps can also be conducted in the curved regions of the track.

FIG. 21 illustrates an example of controlling the movers 24 to perform different index motions in the same track. Mover motion, MD, is from left to right. First, the movers 24 dwell to allow loading of two plastic molded blade carriers 92. In this case, the molded blade carriers 92 are components of a razor that are the payload for the carrier tools 90. The carrier tools 90 may each have at least one cavity 96 therein for receiving one, or more, of the molded blade carriers 92. After loading, two movers 24 rapidly index ahead two positions. This rapid double index enables a longer dwell for doing time dependent processes such as loading two blade carriers 92. Stopping more movers 24 can allow even longer dwells and the high acceleration capability of this technology can allow rapidly indexing larger numbers of movers 24. This can allow stopping products produced at very high throughput and providing long dwell times for time dependent processes such as heat sealing, stamping, embossing, etc. After the blade carriers 92 are loaded, next the movers 24 are each indexed once per product to allow each of the four metal blades 94 to be inserted into the blade carriers 92 in sequence during each dwell. All of these indexing motions can be periodic and synchronous, or they can be asynchronous and triggered based on external random events.

FIG. 22 illustrates an example of controlling the movers 24 to perform continuous and indexing motions in the same track. Mover 24 motion is from left to right. On the left, movers 24 are moving at a constant velocity to enable inkjet printing onto the cartridge by an inkjet printer 98. The print is registered to the position of the movers 24 by precisely coordinating the motion. After printing, the movers 24 are stopped in groups of four to allow removal of four razor cartridges 100 for placement in packaging. This index timing and pitch of the movers 24 can be adjusted to create different size and spacing of groups for various packaging formats. For instance, the cartridges could be stopped 2, 3, 4, 5, or 6 at a time to provide the required group size. This timing is easily software adjustable.

Figure 23:
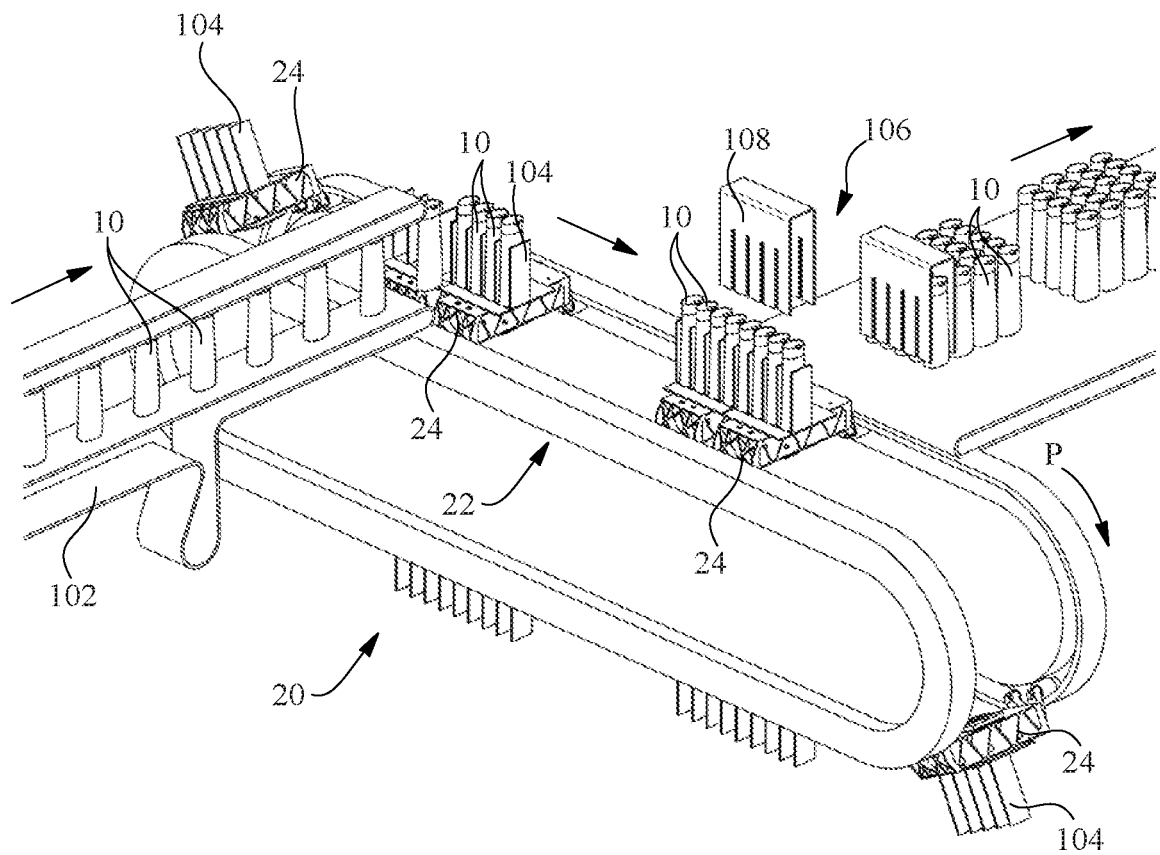
FIG. 23 is a simplified fragmented perspective view that show the apparatus being used to create groups of bottles for a case packing application.

FIG. 23 illustrates another application of the controlled motion system 20 to create groups of bottles 10 for a case packing application. U.S. Pat. No. 9,573,771 describes a system using individual movers to acquire and create software selectable groups of bottles. In U.S. Pat. No. 9,573,771, the movers are each driven by individual servo driven timing belts. FIG. 23 shows an alternative system in which each mover 24 can be fitted with a rack and driven by a plurality of pinion gears and timing belts as described herein. The racks, drive elements, and motors in FIG. 23 are not shown for simplicity, but would be in the form shown and described in conjunction with the preceding figures herein. This alternative system 20 would provide superior acceleration capability and dynamic performance. Each mover 24 is provided with flights 104 that are spaced to transport bottles 10. The mover 24 can be indexed on demand to fill the mover 24 with four bottles 10 (or, in other configurations, with any other suitable number of bottles). The timing of bottles 10 supplied to the movers 24 can be periodic, or the timing can be random. The random timing of bottles 10 can be sensed with an article position sensor 102, and the mover 24 can respond to the random input sensed. Random timing of bottles 10 can be due to missing bottles 10 in a periodic conveying stream or due to random placement of bottles 10 on the conveyor. The movers 24 can then transport bottles 10 to the unloading region 106 where groups of movers 24 are coordinated to provide the desired bottle count for unloading. The groups of bottles 10 can be removed from the track 22 by a stripper tool 108, and then placed on another conveyor. Movers 24 can then return along path P to be loaded. Although this example is related to bottles 10, the principle disclosed could be reapplied to any desired articles 10.

The controlled motion system 20 is well suited for coupling and conveying articles 10 between upstream and downstream systems that are not perfectly synchronized or not running at the same production rate (articles per minute). For instance, if an upstream apparatus that normally provides a periodic supply of articles 10 has a missing article due to a reject, the controlled motion system 20 can provide a buffer or accumulation to keep a non-interrupted supply of periodic articles to a downstream apparatus. If the upstream apparatus provides a non-uniform non-constant production rate of articles 10, the controlled motion system 20 can provide a buffer and provide a constant periodic flow rate of articles to a downstream apparatus, or can smooth out rapid changes in instantaneous rate and provide more gradual changes to rate that the downstream apparatus can adjust to. If a downstream apparatus must momentarily stop, the controlled motion system 20 can provide a buffer and allow the upstream apparatus to continue to run at normal rate uninterrupted. The controlled motion system 20 is also useful for connecting apparatuses that start, stop, ramp up, or ramp down at different rates. For instance if the downstream apparatus stops faster than the upstream apparatus, the controlled motion system 20 can store articles produced by the upstream apparatus once the downstream apparatus is stopped.

Figure 24:
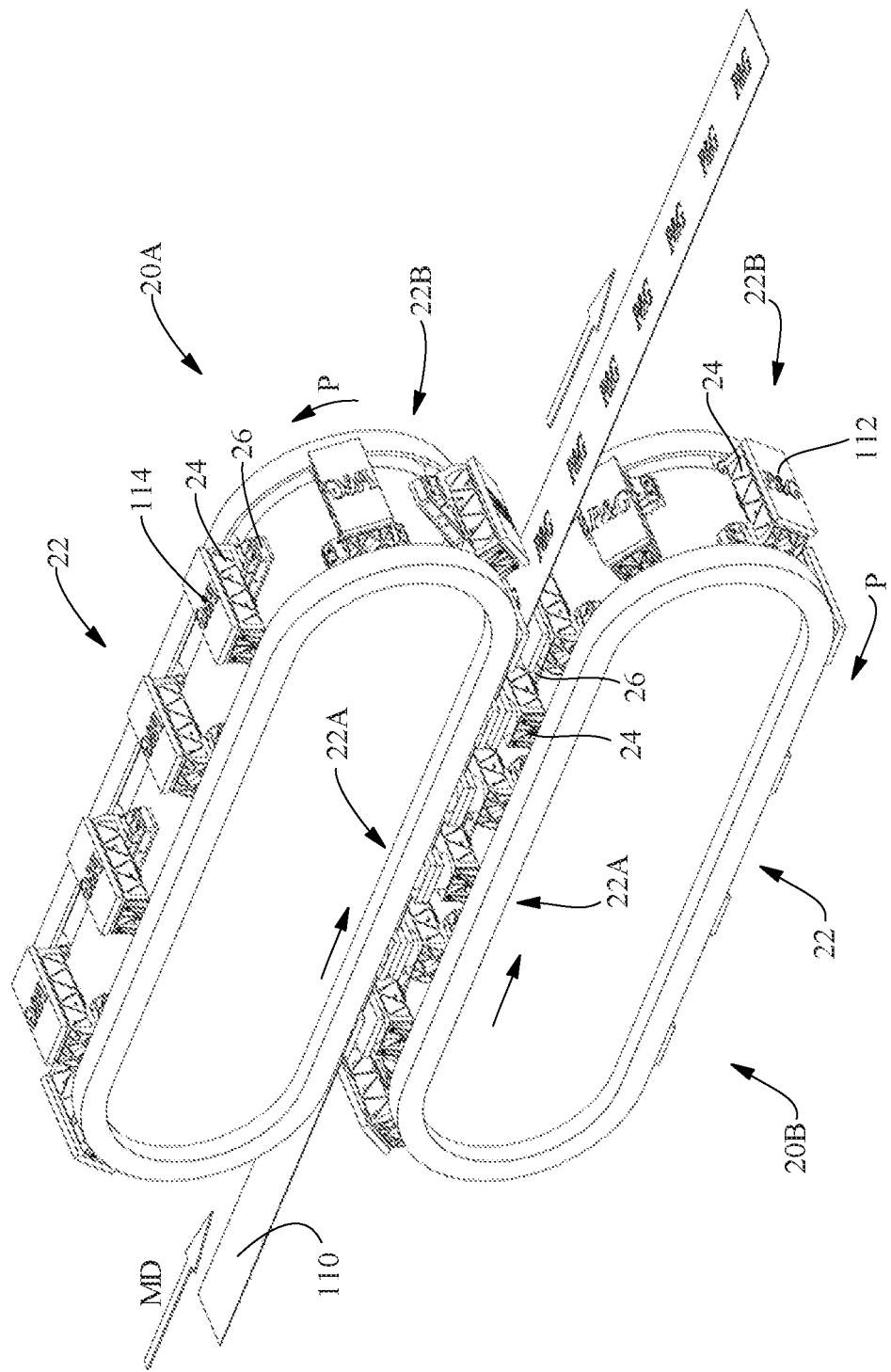
FIG. 24 is a perspective view of a portion of an exemplary apparatus used to create dwell time for continuous motion time depended processes (with various components not shown for simplicity).

FIG. 24 illustrates another application of the controlled motion system 20 that can be used to create dwell time for continuous motion, time dependent processes in a web substrate 110 moving in a linear machine direction path. Time dependent processes include transformations and interfaces such as embossing with heat, heat sealing, embossing with gradual strain of web material 110, stamping, punching, printing, thermoforming, curing, ultrasonic welding, bonding of multiple materials, etc. Typically, tooling 112 and 114 is used to transform or manipulate the web material 110 during dwell. The transformation or interface of the tooling 112 with the web substrate 110 typically will happen at a localized discrete region of the web substrate, and these localized regions are disposed in the machine direction at a constant pitch distance. The tooling can comprise pairs of matched tooling such as 112 and 114, or the tooling can comprise a single tool that contacts or interfaces with the web 110. The web 110 can be continuous in the machine direction or can be discrete sheets or articles 10.

The embodiment in FIG. 24 includes two controlled motion systems 20A and 20B, each with closed loop tracks 22. The drive elements and motors in FIG. 24 are not shown for simplicity, but would be in the form shown and described in conjunction with the preceding figures herein. The controlled motion systems 20A and 20 B are configured each with linear track sections 22A parallel to a web 110 running in continuous linear motion. Controlled motion system 20A is positioned above the web 110 and controlled motion system 20B is positioned below the web 110. This example illustrates heated embossing using matched male and female heated tooling 112 and 114, respectively. Other processes can use other tooling which can be matched between two controlled motion systems, articulated matched tooling transported by a single controlled motion system, and tooling that works from one side of a web that is transported by a single controlled motion system. For this example embodiment, each mover 24 on upper controlled motion system 20A is equipped with a female heated tool 114. Each mover 24 on lower controlled motion system 20B is equipped with a male heated tool 112 that is matched to work with the heated female tool 114. In this embodiment, the tooling is configured to emboss the letters "P&G" into the web 110. Upper and lower movers 24 with corresponding female and male tooling are transported at matched tangential velocity with the web substrate 110. Motion for both upper and lower movers 24 and tooling is coordinated such that the male and female tooling 112 and 114 is precisely synchronized and registered with the position for embossment on the web 110. As the male and female tooling 112 and 114 travel in close proximity and at constant speed with the web 110, the male tooling 112 is actuated to penetrate the web 110 and to push the web 110 into the mating female tooling 114. Because both tools are traveling with the web 110 in a straight line, the tooling can remain in contact with the web 110 for an extended amount of dwell time. This can provide adequate time to heat the web 110 and also cool the web 110 after embossment is complete. Once embossment is complete, the male tool 112 is withdrawn and the embossed web 110 can exit beyond the controlled motion systems 20A and 20B.

Because the motion of each individual mover 24 is individually controlled for position, velocity, acceleration, and jerk; it is possible to use the controlled motion systems 20A and 20B to adjust the machine direction spacing of discrete features such as a heated embossment for different size products on the fly by using a simple software change to adjust the commanded pitch spacing between movers 24. When the pitch of the movers 24 in contact with the web 110 are changed, the relative position and accelerations of the movers 24 on the return path curves and straight away from the web 110 must be adjusted. For instance, if the pitch in contact with the web 110 is increased, the movers 24 are deaccelerated after contacting the web 110 to a smaller average pitch and smaller velocity until they are accelerated again to the pitch and velocity needed to register with the web 110. It is also possible to achieve continuously variable pitch or position to allow the mover 24 and tooling 112 and 114 to match a variable position in the web 110 or to wait for a missing product such as with a reject.

FIG. 25 illustrates a closed path controlled motion system 20 created as with a combination of sections driven by pinions 32 and timing belts 36. The motors are not shown for simplicity, but would be in the form shown and described in conjunction with the preceding figures herein. Sections where relative motion between movers 24 is needed employ a plurality of pinions 32. Sections where conveying is needed without relative motion between movers 24 employ timing belts 36. The cost per unit length for sections using timing belts 36 can be more affordable than sections using a sequence of pinions 32. The controlled motion system 20 can also be scaled to any desired size and can be large enough to convey a product through an entire converting line or factory.

The controlled motion system 20 provides a high speed, high force, independent control of multiple movers (or cars) along a path, which may be a closed track. This technology can be used to create higher performance processes for numerous purposes including, but not limited to: re-pitching, material transport, extended residence time, and automated changeover.

The performance of the system described herein in comparison to prior systems is described in the table below. The numbers in the table for the Comparative Examples are from manufacturers' literature. The numbers in the table for the Controlled Motion System described herein are based on calculations using motor torque from manufacturers' literature.

Comparison of Performance of Controlled Motion System to Prior Systems

| Motor Description | Maximum Tangential Velocity (m/s) | Peak Thrust Force at Maximum Velocity (N) | Peak Thrust Force at Zero Velocity (N) | Continuous Thrust Force at Maximum Velocity (N) | Continuous Thrust Force at Zero Velocity (N) |
|---|---|---|---|---|---|
| Controlled Motion System Example Configuration 1 Using Allen Bradley MPL-B580J-MJ74AA Rotary Servo Motors Coupled 1:1 with 20T CP20 127.325 mm Pitch Diameter Gear Pinions Driving Movers with CP20 Gear Racks | 25.33 | 675 | 1272 | 314 | 534 |
| Controlled Motion System Example Configuration 2 Using Allen Bradley MPL-B580J-MJ74AA Rotary Servo Motors Coupled 1:1 with 13T CP20 82.761 mm Pitch Diameter Gear Pinions Driving Movers with CP20 Gear Racks | 16.47 | 1039 | 1957 | 483 | 822 |
| Controlled Motion System Example Configuration 3 Using Allen Bradley MPL-B580J-MJ74AA Rotary Servo Motors Coupled with a 3:1 planetary gear reducer to a 13T CP20 82.761 mm Pitch Diameter Gear Pinions Driving Movers with CP20 Gear Racks | 5.49 | 3117 | 5872 | 1450 | 2465 |
| Comparative Example 1: Rockwell Automation iTRAK 2198T-L16-T0504-A00N-2E1E-NS Motor Module with 2198T-M0515-A000 Mover Magnet per Bulletin Number 2198T-TD001B-EN-P | 5 | 220 | 265 | 139 | 112 |
| Comparative Example 2: Rockwell Automation iTRAK 2198T-L16-T1504-A00N-2E1E-NS Motor Module with 2198T-M1515-A000 Mover Magnet per Bulletin Number 2198T-TD001B-EN-P | 2.7 | 0 | 793 | 0 | 337 |
| Comparative Example 3: Beckhoff XTS AT2000-1000 | 4 | 80 | 100 | 30 | 30 |
| Comparative Example 4: Rockwell Automation MagneMotion MagneMover LITE ™ with Standard Puck | 2.5 | 2.6 | 5.4 | 2.6 | 5.4 |

The term "joined to" as used throughout this disclosure, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of independently controlling the velocity profile of movers traveling along a path comprising the steps of:
   a) providing a system comprising:
      a track that forms a path for movers;
      a plurality of movers movably mounted on the track for moving along said path, said movers comprising a driven member that is oriented to be contacted by at least one drive element at any position along the path, wherein said movers comprise at least a first mover and a second mover;
      a plurality of rotationally free drive elements having rotational axes that are arranged along the track, wherein said drive elements comprise at least a first drive element and a second drive element, wherein said second drive element is positioned downstream in a machine direction from said first drive element, said drive elements each comprising a surface that is oriented to contact the driven member of said movers, wherein said drive elements are configured to sequentially engage the driven member of said movers to provide controlled motion of said movers independently around said track, wherein the drive elements are each driven by a rotary motor; and a programmable computer control system in communication with the rotary motors for controlling the motion of the rotary motors;

b) synchronously mechanically engaging the driven member of the first mover mechanically with the first drive element at a first position along the path, wherein the first drive element is driven by a first rotary motor with a first rotational velocity, and the first rotational velocity of said first drive element prescribes the tangential velocity of the first mover;

c) moving said first mover with said first drive element at a first velocity profile and first acceleration to a second position;

d) synchronously mechanically engaging the first mover with the second drive element at a second position, wherein the second drive element is driven by a second rotary motor with a second rotational velocity, and the second rotational velocity prescribes the tangential velocity of the first mover;

e) moving a second mover and its driven member into position to approach and mechanically engage said first drive element, wherein the driven member of said second mover is moving at a tangential velocity;

f) adjusting the rotational velocity of the first drive element with the first drive motor to a third rotational velocity, where the third rotational velocity of said first drive element causes the tangential velocity of the first drive element to match the tangential velocity of the approaching driven member of the second mover; and the mechanical engagement between the first drive element and the approaching driven member of the second mover are synchronized; and g) synchronously mechanically engaging the driven member of the second mover with the first drive element at said first position wherein the first drive element is driven by said first rotary motor with said third rotational velocity, and the third rotational velocity of said first drive element prescribes the tangential velocity of the second mover; while the tangential velocity of the first mover is independently controlled by the second drive element driven by the second rotary motor.

2. The method of claim 1 wherein the following conditions occur when the first mover is being transferred from engagement with the first drive element to the second drive element:

1) as the first mover travels, and the driven member of the first mover is driven by mechanical engagement with the first drive element which is being driven by the first rotary motor, the driven member of the first mover encounters the second drive element and is mechanically engaged by the second drive element with a rotary velocity and position synchronized at equal tangential velocity with the first drive element, and the mechanical engagement between the first driven element and the second drive element are synchronized in phase; and 2) during transfer, there is some overlapping time period where the movement and velocity of the first mover is controlled by the synchronized rotational position, velocity, and acceleration of both the first and second drive elements.

3. The method of claim 1 wherein the following conditions occur after the first mover is transferred from engagement with the first drive element to the second drive element:

as the first mover travels, the first drive element disengages the first mover, wherein the first mover will then only be controlled by the second drive element; and the second mover approaches the first drive element with a tangential velocity, and the rotational velocity and phase of the first drive element is adjusted to match the tangential velocity and phase of the driven member of the approaching second mover.

4. The method of claim 1 wherein said path is in the form of a closed loop.

5. The method of claim 1 wherein at least a portion of said path is linear.

6. The method of claim 1 wherein the first and second drive elements are pinion gears.

7. The method of claim 1 wherein the first and second driven members are gear racks.

8. The method of claim 1 wherein the first and second drive elements are toothed timing belts.

9. The method of claim 1 wherein the first and second driven members are gear racks having a rack gear profile that is shaped to be driven alternatively by either a pinion gear or a toothed timing belt.

10. The method of claim 9 wherein the first drive element is a pinion gear and the second drive element is a toothed timing belt.

11. The method of claim 9 wherein the first drive element is a toothed timing belt and the second drive element is a pinion gear.

12. The method of claim 1 wherein the plurality of drive elements further comprises a third drive element that is driven by a third rotary motor, wherein said third drive element is positioned downstream in the machine direction from said second drive element, said method further comprising steps of:

h) moving the first mover and its driven member into position to approach and mechanically engage said third drive element, wherein the driven member of said first mover is moving at a tangential velocity;

i) adjusting the rotational velocity of the third drive element with the third drive motor to a fourth rotational velocity, where the fourth rotational velocity of said third drive element causes the tangential velocity of the third drive element to match the tangential velocity of the approaching driven member of the first mover; and the mechanical engagement between the third drive element and the approaching driven member of the first mover are synchronized; and j) synchronously mechanically engaging the driven member of the first mover with the third drive element at a third position, wherein the third drive element is driven by the third rotary motor with a fourth rotational velocity, and the fourth rotational velocity of said third drive element prescribes the tangential velocity of the first mover; while the tangential velocity of the first mover is independently controlled by the third drive element which is driven by the third rotary motor, wherein the motion profile of the first and second movers are independent, allowing controlled relative tangential motion between the first and second movers.

13. The method of claim 12 wherein said plurality of movers further comprises a third mover that is upstream of said second mover, and said method further comprises the steps of:

k) synchronously mechanically engaging the driven member of the second mover with the second drive element at said second position wherein the second drive element is driven by a second rotary motor with a fifth rotational velocity, and the fifth rotational velocity of said second drive element prescribes the tangential velocity of the second mover; and l) synchronously mechanically engaging the driven member of the third mover with the first drive element at said first position wherein the first drive element is driven by the first rotary motor with a sixth rotational velocity, and the sixth rotational velocity of said first drive element prescribes the tangential velocity of the third mover, wherein the motion profile of the first, second, and third movers are independent, allowing controlled relative tangential motion between the first, second, and third movers.

14. The method of claim 1 wherein:

the path is in the form of a closed loop that has a race track configuration having two linear sides, two curvilinear portions at the ends, and transitions between each of the linear sides and the curvilinear ends, wherein the transitions and curvilinear portions at the ends of the track form a spline curve;

said drive elements comprise a third drive element that is positioned at a third position that is downstream from said second drive element, wherein said third drive element is a toothed timing belt that is driven by a third rotary motor connected to a third drive element drive sprocket, wherein portions of said timing belt follow the path of the curvilinear portions and the transitions at one end of the track, wherein portions of the belt along the spline curve are supported by a plurality of backup rollers that are configured to allow the belt to drive the driven members of the movers along the path; and the first driven member of the first mover comprises a rack that is configured to mechanically engage with said toothed timing belt, wherein said first mover approaches the third drive element, and said method further comprises:

h) adjusting the rotational velocity of the third drive element drive sprocket with the third drive motor to a fourth rotational velocity, where the fourth rotational velocity of said third drive element causes the tangential velocity of the toothed timing belt to match the tangential velocity of the approaching rack of the first mover and the mechanical engagement between the teeth of the timing belt and the approaching rack of the first mover are synchronized;

i) synchronously mechanically engaging the rack of the first mover with the timing belt at said third position, wherein the timing belt is driven by the third rotary motor with a fourth rotational velocity, and the fourth rotational velocity of said third drive element sprocket prescribes the tangential velocity of the first mover; and j) moving the first mover along the curvilinear and transition sections of the path while being driven by the timing belt, wherein the plurality of backup rollers supporting the back of the timing belt keep the teeth of the timing belt engaged with the teeth of the rack maintaining the ability of the timing belt to exert motive driving force.

15. The method of claim 14 wherein the tangential velocity profile of the first mover can be continuously adjusted by adjusting the rotational velocity profile of the third rotary motor while the timing belt is engaged with the rack for the first mover.

16. The method of claim 1 further comprising a homing position sensor located along said track, wherein homing positions of the first and second movers are measured using the homing position sensor to establish the relationship between the path position of the first and second movers with the rotary motors connected to the drive elements engaged with the first and second driven members, wherein a baseline for the path position of the first and second movers can be determined based on the rotation positions of the drive motors connected to the drive elements.

17. The method of claim 16 wherein the programmable computer control system may assign the movers virtual positions, and the virtual positions of the first and second movers are tracked by the programmable computer control system as an offset from the home position based on the commanded motion enacted on the first and second movers by the coordinated motion of the rotary motors, wherein the path position of first and second movers can continuously be tracked by said programmable computer control system without taking physical measurements of movers along the path.

18. A method of independently controlling the velocity profile of movers traveling along a path in different lanes, comprising the steps of:

a) providing a system comprising:
a track that forms a path for movers;
a first lane and a second lane that are parallel to said path;
a first mover movably mounted on the track for moving along said path, said first mover comprising a first driven member that is oriented to travel in the first lane and to be contacted by at least one drive element at any position along the path;
a second mover movably mounted on the track for moving along said path, said second mover comprising a second driven member that is oriented to travel in the second lane and to be contacted by at least one drive element at any position along the path;
a first plurality of drive elements arranged along the first lane of the track, said drive elements each comprising a surface that is oriented to contact the first driven member of said first mover, wherein said drive elements are configured to sequentially engage the first driven member of said movers to provide controlled motion of said first mover independently around said track, wherein the first plurality of drive elements comprise at least a first drive element and a second drive element, and said first and second drive elements are each driven by a rotary motor;
a second plurality of drive elements arranged along the second lane of the track, said drive elements each comprising a surface that is oriented to contact the second driven member of said second mover, wherein said drive elements are configured to sequentially engage the second driven member of said movers to provide controlled motion of said second mover independently around said track, wherein the second plurality of drive elements comprise at least a third drive element and a fourth drive element, and said third and fourth drive elements are each driven by a rotary motor; and
a programmable computer control system in communication with the rotary motors for controlling the motion of the rotary motors;

b) synchronously mechanically engaging the driven member of the first mover with the first drive element at a first position along the path, wherein the first drive element is driven by a first rotary motor with a first rotational velocity, and the first rotational velocity of said first drive element prescribes the tangential velocity of the first mover;

c) moving said first mover with said first drive element at a first velocity profile and first acceleration to a second position;

d) synchronously mechanically engaging the first mover with the second drive element at a second position, wherein the second drive element is driven by a second rotary motor with a second rotational velocity, and the second rotational velocity prescribes the tangential velocity of the first mover;

e) synchronously engaging the driven member of the second mover mechanically with the third drive element at a third position along the path, wherein the third drive element is driven by a third rotary motor with a third rotational velocity, and the third rotational velocity of said third drive element prescribes the tangential velocity of the second mover;

f) moving said second mover with said third drive element at a second velocity profile and second acceleration to a fourth position; and g) synchronously mechanically engaging the second mover with the fourth drive element at a fourth position, wherein the fourth drive element is driven by a fourth rotary motor with a fourth rotational velocity, and the fourth rotational velocity prescribes the tangential velocity of the second mover.

19. The method of claim 18 further comprising a third mover movably mounted on the track for moving along said path, said third mover comprising a third driven member that is oriented to travel in the first lane and to be contacted by at least one drive element at any position along the path, wherein said method further comprises the following steps which take place after the first mover is transferred from engagement with the first drive element to the second drive element:

h) adjusting the rotational velocity of the first drive element with the first drive motor to a fifth rotational velocity, where the fifth rotational velocity of said first drive element causes the tangential velocity of the first drive element to match the tangential velocity of the approaching driven member of the third mover; and the mechanical engagement between the first drive element and the approaching driven member of the third mover are synchronized; and i) synchronously mechanically engaging the driven member of the third mover with the first drive element at a first position wherein the first drive element is driven by said first rotary motor with said fifth rotational velocity, and the fifth rotational velocity of said first drive element prescribes the tangential velocity of the third mover; while the tangential velocity of the first mover is independently controlled by the second drive element driven by the second rotary motor.

20. The method of claim 19 further comprising a fourth mover movably mounted on the track for moving along said path, said fourth mover comprising a fourth driven member that is oriented to travel in the second lane and to be contacted by at least one drive element at any position along the path, wherein said method further comprises the following steps which take place after the second mover is transferred from engagement with the third drive element to the fourth drive element:

j) adjusting the rotational velocity of the third drive element with the third drive motor to a sixth rotational velocity, where the sixth rotational velocity of said third drive element causes the tangential velocity of the third drive element to match the tangential velocity of the approaching driven member of the fourth mover; and the mechanical engagement between the third drive element and the approaching driven member of the fourth mover are synchronized; and synchronously mechanically engaging the driven member of the fourth mover with the third drive element at a third position wherein the third drive element is driven by said third rotary motor with said sixth rotational velocity, and the sixth rotational velocity of said third drive element prescribes the tangential velocity of the fourth mover;

while the tangential velocity of the second mover is independently controlled by the fourth drive element driven by the fourth rotary motor.

* * * * *